(12) United States Patent
Rouse et al.

(10) Patent No.: US 9,582,256 B2
(45) Date of Patent: Feb. 28, 2017

(54) AUTOMATED COOPERATIVE CONCURRENCY WITH MINIMAL SYNTAX

(71) Applicant: SAS INSTITUTE, INC., Cary, NC (US)

(72) Inventors: Jack Joseph Rouse, Cary, NC (US); Leonardo Bezerra Lopes, Cary, NC (US); Robert William Pratt, Niskayuna, NY (US)

(73) Assignee: SAS Institute Inc., Cary, NC (US)

( * ) Notice: Subject to any disclaimer, the term of this patent is extended or adjusted under 35 U.S.C. 154(b) by 444 days.

(21) Appl. No.: 14/143,273

(22) Filed: Dec. 30, 2013

(65) Prior Publication Data
US 2014/0297997 A1 Oct. 2, 2014

Related U.S. Application Data

(60) Provisional application No. 61/781,385, filed on Mar. 14, 2013.

(51) Int. Cl.
*G06F 9/45* (2006.01)
*G06F 9/38* (2006.01)

(52) U.S. Cl.
CPC .............. *G06F 8/45* (2013.01); *G06F 8/423* (2013.01); *G06F 8/452* (2013.01); *G06F 8/41* (2013.01);
(Continued)

(58) Field of Classification Search
CPC ... G06F 8/443; G06F 8/41; G06F 8/45; G06F 8/456; G06F 8/452; G06F 8/4452; G06F 9/381
See application file for complete search history.

(56) References Cited

U.S. PATENT DOCUMENTS

| | | | | |
|---|---|---|---|---|
| 5,121,498 A | * | 6/1992 | Gilbert | G06F 8/452 717/141 |
| 5,386,562 A | * | 1/1995 | Jain | G06F 8/452 717/160 |

(Continued)

OTHER PUBLICATIONS

Neal Gafter, "Concurrent Loops Using Java Closures", Neal Gafter's Blog, 2006, <http://gafter.blogspot.com/2006/10/concurrent-loops-using-java-closures.html>, pp. 1-10.*

(Continued)

*Primary Examiner* — Thuy Dao
*Assistant Examiner* — Hanh T Bui

(57) ABSTRACT

Various embodiments are generally directed to techniques for reducing syntax requirements in application code to cause concurrent execution of multiple iterations of at least a portion of a loop thereof to reduce overall execution time in solving a large scale problem. At least one non-transitory machine-readable storage medium includes instructions that when executed by a computing device, cause the computing device to parse an application code to identify a loop instruction indicative of an instruction block that includes instructions that define a loop of which multiple iterations are capable of concurrent execution, the instructions including at least one call instruction to an executable routine capable of concurrent execution; and insert at least one coordinating instruction into an instruction sub-block of the instruction block to cause sequential execution of instructions of the instruction sub-block across the multiple iterations based on identification of the loop instruction. Other embodiments are described and claimed.

34 Claims, 15 Drawing Sheets

(52) U.S. Cl.
CPC ............ *G06F 8/4452* (2013.01); *G06F 8/456* (2013.01); *G06F 9/381* (2013.01)

(56) References Cited

U.S. PATENT DOCUMENTS

| | | | | |
|---|---|---|---|---|
| 5,758,183 | A * | 5/1998 | Scales | G06F 9/544 |
| | | | | 710/38 |
| 5,761,470 | A * | 6/1998 | Yoshida | G06F 9/30145 |
| | | | | 712/208 |
| 6,192,515 | B1 * | 2/2001 | Doshi | G06F 8/4452 |
| | | | | 712/241 |
| 6,374,403 | B1 * | 4/2002 | Darte | G06F 8/45 |
| | | | | 717/150 |
| 6,466,988 | B1 * | 10/2002 | Sukegawa | G06F 12/0815 |
| | | | | 709/248 |
| 6,708,296 | B1 * | 3/2004 | Gover | G06F 11/3466 |
| | | | | 714/47.2 |
| 7,159,211 | B2 * | 1/2007 | Jalan | G06F 8/458 |
| | | | | 717/124 |
| 7,302,557 | B1 * | 11/2007 | Hwu | G06F 8/4452 |
| | | | | 712/241 |
| 7,503,039 | B2 * | 3/2009 | Inoue | G06F 8/45 |
| | | | | 717/151 |
| 7,844,802 | B2 * | 11/2010 | McKenney | G06F 9/3834 |
| | | | | 717/151 |
| 8,738,860 | B1 * | 5/2014 | Griffin | G06F 12/0897 |
| | | | | 711/122 |
| 8,930,926 | B2 * | 1/2015 | Bastoul | G06F 8/453 |
| | | | | 717/151 |
| 2003/0233643 | A1 * | 12/2003 | Thompson | G06F 8/4452 |
| | | | | 717/161 |
| 2004/0268334 | A1 * | 12/2004 | Muthukumar | G06F 8/4452 |
| | | | | 717/160 |
| 2005/0097509 | A1 * | 5/2005 | Rong | G06F 8/4452 |
| | | | | 717/106 |
| 2005/0283772 | A1 * | 12/2005 | Muthukumar | G06F 8/4452 |
| | | | | 717/151 |
| 2006/0155792 | A1 * | 7/2006 | Inoue | G06F 12/023 |
| 2007/0169046 | A1 * | 7/2007 | Gordy | G06F 8/456 |
| | | | | 717/151 |
| 2009/0271774 | A1 * | 10/2009 | Gordy | G06F 8/456 |
| | | | | 717/149 |
| 2009/0288075 | A1 * | 11/2009 | Song | G06F 8/452 |
| | | | | 717/160 |
| 2010/0269102 | A1 * | 10/2010 | Latorre | G06F 9/3842 |
| | | | | 717/130 |
| 2010/0274972 | A1 * | 10/2010 | Babayan | G06F 9/3842 |
| | | | | 711/125 |
| 2011/0167416 | A1 * | 7/2011 | Sager | G06F 8/4442 |
| | | | | 717/149 |
| 2012/0151463 | A1 * | 6/2012 | Kalogeropulos | G06F 8/458 |
| | | | | 717/160 |
| 2013/0086564 | A1 * | 4/2013 | Felch | G06F 8/41 |
| | | | | 717/145 |

OTHER PUBLICATIONS

Cosmin E. Oancea and Alan Mycroft, Set-Congruence Dynamic Analysis for Thread-Level Speculation (TLS), 2008, retrieved online on Oct. 6, 2016, pp. 1-15. Retrieved from the Internet: <URL: http://www.diku.dk/~zgh600/Publications/CosAlanDynAnTLS.pdf>.*

Danny Dig et al., ReLooper: Refactoring for Loop Parallelism in Java, ACM, 2009, retrieved online on Oct. 6, 2016, pp. 793-794. Retrieved from the Internet: <URL: http://delivery.acm.org/10.1145/1650000/1640018/p793-dig.pdf?>.*

"Usage Note 42332: By group processing with PROC OPTMODEL", SAS Institute Inc., Feb. 8, 2011, 5 pages. (aurthor unknown).

* cited by examiner

AUTOMATED COOPERATIVE CONCURRENCY WITH MINIMAL SYNTAX

CROSS-REFERENCE TO RELATED APPLICATION

This application claims the benefit of priority under 35 U.S.C. §119(e) of U.S. Provisional Application Ser. No. 61/781,385, entitled "AUTOMATED COOPERATIVE CONCURRENCY IN OPTIMIZATION WITH MINIMAL SYNTAX," filed Mar. 14, 2013, which is incorporated herein by reference in its entirety.

BACKGROUND

It has become commonplace to solve large scale problems in such areas as optimization and simulation through concurrent execution of numerous iterations of a routine in which a calculation and/or search process is performed (sometimes referred to as concurrent routines or "coroutines"). In each such iteration, the same calculation or search process is performed with a different version of inputs than the others such that a concurrent "trial and error" process on a large scale is performed. Execution of such iterations may continue until either an entire predetermined range of versions of inputs has been tried or at least one of the versions of inputs has begotten a result fitting predetermined criteria.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

At least one non-transitory machine-readable storage medium may include instructions that when executed by a computing device, cause the computing device to parse an application code to identify a loop instruction indicative of an instruction block that includes instructions that define a loop of which multiple iterations are capable of concurrent execution, the instructions including at least one call instruction to an executable routine capable of concurrent execution; and insert at least one coordinating instruction into an instruction sub-block of the instruction block to cause sequential execution of instructions of the instruction sub-block across the multiple iterations based on identification of the loop instruction.

A computer-implemented method may include parsing, with a processor component, an application code to identify a loop instruction indicative of an instruction block that includes instructions that define a loop of which multiple iterations are capable of concurrent execution, the instructions including at least one call instruction to an executable routine capable of concurrent execution; and inserting at least one coordinating instruction into an instruction sub-block of the instruction block to cause sequential execution of instructions of the instruction sub-block across the multiple iterations based on identification of the loop instruction.

An apparatus may include a processor component; a parsing component for execution by the processor component to parse an application code to identify a loop instruction indicative of an instruction block that includes instructions that define a loop of which multiple iterations are capable of concurrent execution, the instructions including at least one call instruction to a executable routine capable of concurrent execution; and a semaphore component for execution by the processor component to insert at least one coordinating instruction into an instruction sub-block of the instruction block to cause sequential execution of instructions of the instruction sub-block across the multiple iterations based on identification of the loop instruction.

A computer-implemented method may include distinguishing a loop instruction indicative of instructions that define a loop of which multiple iterations are capable of concurrent execution from a sequential loop instruction indicative of other instructions that define another loop of which multiple iterations are required to be executed sequentially; and generating an instruction block that includes instructions that when executed cause a processor component to execute the multiple iterations concurrently based on the loop instruction.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other features will become apparent from the following detailed description when considered in conjunction with the drawings.

DETAILED DESCRIPTION

Figure 1:
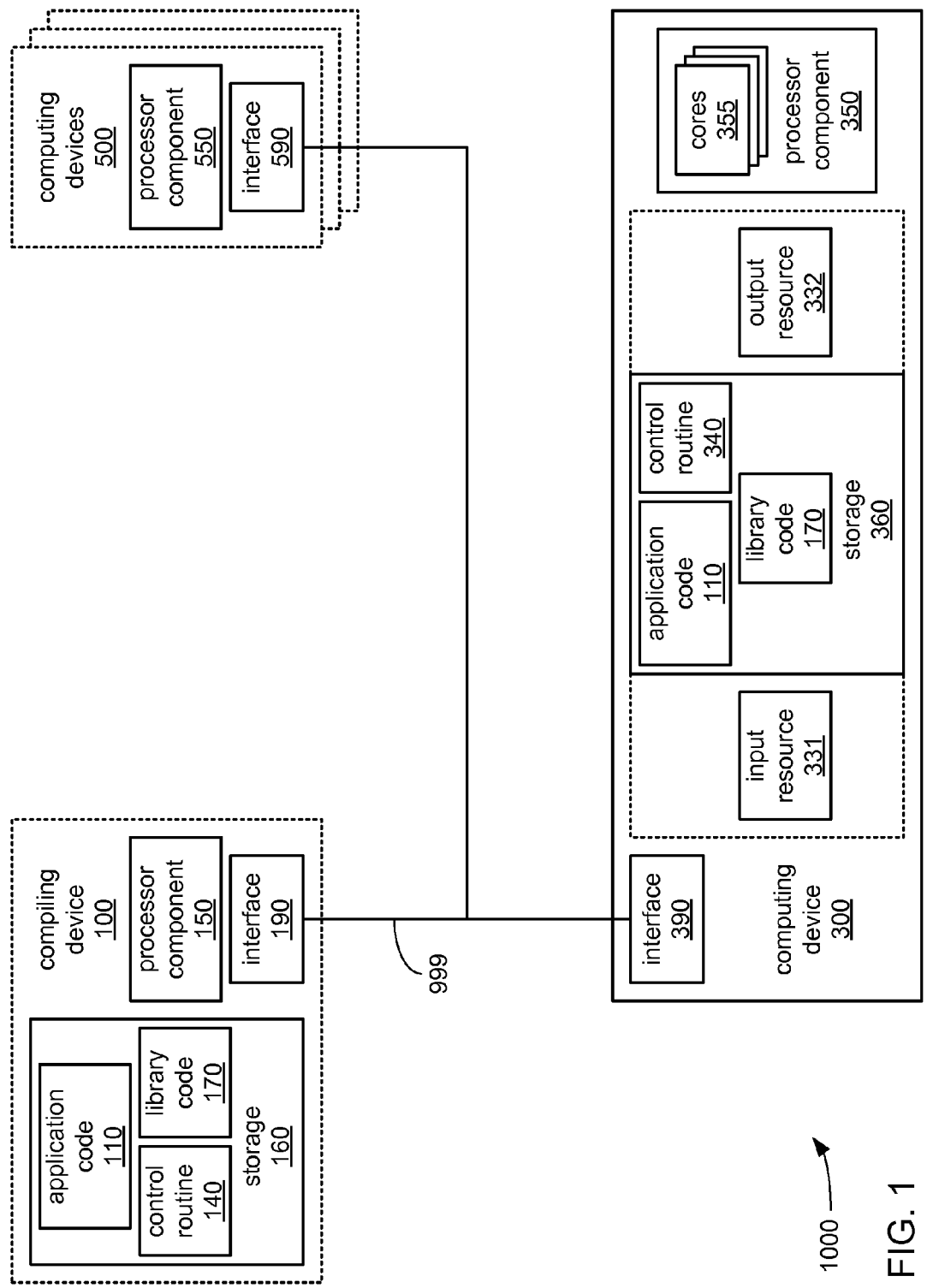
FIG. 1 illustrates an example of an embodiment of a concurrent processing system.

Various embodiments are generally directed to techniques for reducing syntax requirements in application code to cause concurrent execution of multiple iterations of at least a portion of a loop thereof to reduce overall execution time in solving a large scale problem. In particular, the otherwise commonplace requirement of adding syntax to make calls to one or more functions to instantiate threads and explicitly assign portions of an application code to those threads to effect concurrent execution of those portions is averted. Instead, a relatively slight alteration is made to syntax to implement at least one loop instruction to provide an indication that at least a portion of iterations of the loop are to be executed in parallel. Such an alteration to loop syntax may be supported through the inclusion, during compiling and/or other syntax processing, of a library file that includes instructions to implement such concurrency of execution.

A parsing component of a code interpreter or compiler then identifies the at least one loop instruction indicating that a loop includes instructions that may be executed concurrently. In response to detecting such a loop instruction, the instructions within the loop are analyzed to distinguish one or more instructions that call to solve routines of a library that are capable of being executed concurrently from one or more instructions that must still be executed in a sequential order across multiple concurrently executed iterations of the loop. Further, the instructions within the loop are analyzed to detect the instantiation of local resources to be duplicated for each concurrently executed iteration of the loop.

A sub-block of instructions of the loop that precedes a call to such a solve routine (sometimes referred to as "pre-processing instructions") may be caused to execute sequentially across concurrently executed iterations such that the execution of such a pre-processing instruction sub-block of one iteration of the loop must be completed before execution of the same pre-processing instruction sub-block of another iteration is allowed to begin. In this way, an access instruction within a pre-processing instruction sub-block that retrieves data from a shared input resource prior to execution of such a call instruction is ensured to be executed to retrieve that data in correct order across the concurrently executed iterations.

Correspondingly, a sub-block of instructions of the loop that follows a call to such a solve routine (sometimes referred to as "post-processing instructions") may also be caused to execute sequentially across concurrently executed iterations such that the execution of such a post-processing instruction sub-block of one iteration of the loop must be completed before execution of the same post-processing instruction sub-block of another iteration is allowed to begin. In this way, an access instruction within a post-processing instruction sub-block that outputs data to a shared output resource following execution of such a call instruction is ensured to be executed to output that data in correct order across the concurrently executed iterations.

Alternatively or additionally, execution of an instruction sub-block that follows a call to such a solve routine in any of the concurrently executed iterations may be forestalled until execution of an instruction sub-block that precedes that call has been completed in all of the iterations. This may occur, for example, where it is deemed desirable to ensure that no "post-processing" is allowed to occur before all "pre-processing" across all of the iterations has occurred.

For each concurrently executed iteration of the loop, separate instances may be created of one or more data structures that are defined within the block of instructions that make up the loop. In this way, for example, a variable generated within one iteration of the loop is separately maintained from the same variable generated within another iteration of the loop.

With general reference to notations and nomenclature used herein, portions of the detailed description that follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations may include those requiring physical manipulations of physical quantities. Usually, though not necessarily, these quantities take the form of electrical, magnetic or optical communications capable of being stored, transferred, combined, compared, and otherwise manipulated. It proves convenient at times, principally for reasons of common usage, to refer to these communications as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the intended purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that various embodiments can be practiced without these specific details. In other iterations, well known structures and devices are shown in block diagram form in order to facilitate a description thereof. The intention is to cover all modifications, equivalents, and alternatives within the scope of the claims.

FIG. 1 illustrates a block diagram of an example of an embodiment of a concurrent processing system 1000 incorporating a compiling device 100, a computing device 300 and/or one or more other computing devices 500. Each of these computing devices may be any of a variety of types of computing device, including without limitation, a desktop computer system, a data entry terminal, a laptop computer, a netbook computer, a tablet computer, a handheld personal data assistant, a smartphone, a digital camera, a body-worn computing device incorporated into clothing, a computing device integrated into a vehicle (e.g., a car, a bicycle, a wheelchair, etc.), a server, a cluster of servers, a server farm, etc. Embodiments are not limited in this context.

As depicted, these computing devices 100, 300 and 500 may exchange at least a portion of application code 110 for concurrent execution via a network 999. However, one or more of the computing devices 100, 300 and/or 500 may exchange other entirely unrelated data with each other and/or with still other computing devices (not shown) via the network 999. In various embodiments, the network 999 may be a single network that may extend within a single building or other relatively limited area, a combination of connected networks that may extend a considerable distance, and/or may include the Internet. Thus, the network 999 may be based on any of a variety (or combination) of communications technologies, including without limitation, wired technologies employing electrically and/or optically conductive cabling, and wireless technologies employing infrared, radio frequency or other forms of wireless transmission.

The application code 110 may incorporate instructions implementing logic for execution by one or more computing devices to solve any of a variety of complex problems. Such problems may include optimization of a large scale process, such as the scheduling of deliveries to warehouses, the selection of paths for vehicles on delivery routes, or the allocation of supplies to storm shelters ahead of an approaching storm, etc. Alternatively or additionally, such problems may include modeling of complex structures, such as predicting possible paths of hurricanes based on ranges of readings from meteorological data, the manner and extent of deformation of a structure in response to a physical impact, or the performance of a Monte Carlo simulation of any of a variety of complex systems. Other examples of problems solved by the application code 110 will occur to those skilled in the art.

In some embodiments, the application code 110 may first be compiled before it is executed. In such embodiments, such compiling may be performed by the compiling device 100, if present, or may be performed by the computing device 300. Alternatively, the application code 110 may be interpreted as it is executed.

In some embodiments, the execution of numerous iterations of a concurrently executable block of instructions defining a loop within the application code 110 may be distributed among multiple computing devices, and among one or more processor components within each of those computing devices. In such embodiments, such execution may be distributed among the multiple computing devices 500, and such distributed execution may be coordinated via the network 999 with the computing device 300. Alternatively, execution of the numerous iterations may be distributed among multiple cores of one or more processor components of a single computing device, such as the computing device 300.

In various embodiments, the compiling device 100, if present, incorporates one or more of a processor component 150, a storage 160 and an interface 190 to couple the compiling device 100 to the network 999. The storage 160 stores one or more of the application code 110, a control routine 140 and library code 170. The control routine 140 incorporates a sequence of instructions operative on the processor component 150 to implement logic to perform various functions.

In executing the control routine 140, the processor component 150 compiles the application code 110 to generate a compiled version thereof for execution by the computing device 300 and/or the computing devices 500. In so doing, the processor component 150 parses the instructions making up the application code 110 to identify a loop instruction indicating a block of instructions that define a loop of which iterations are able to be executed at least partly concurrently.

Figure 2:
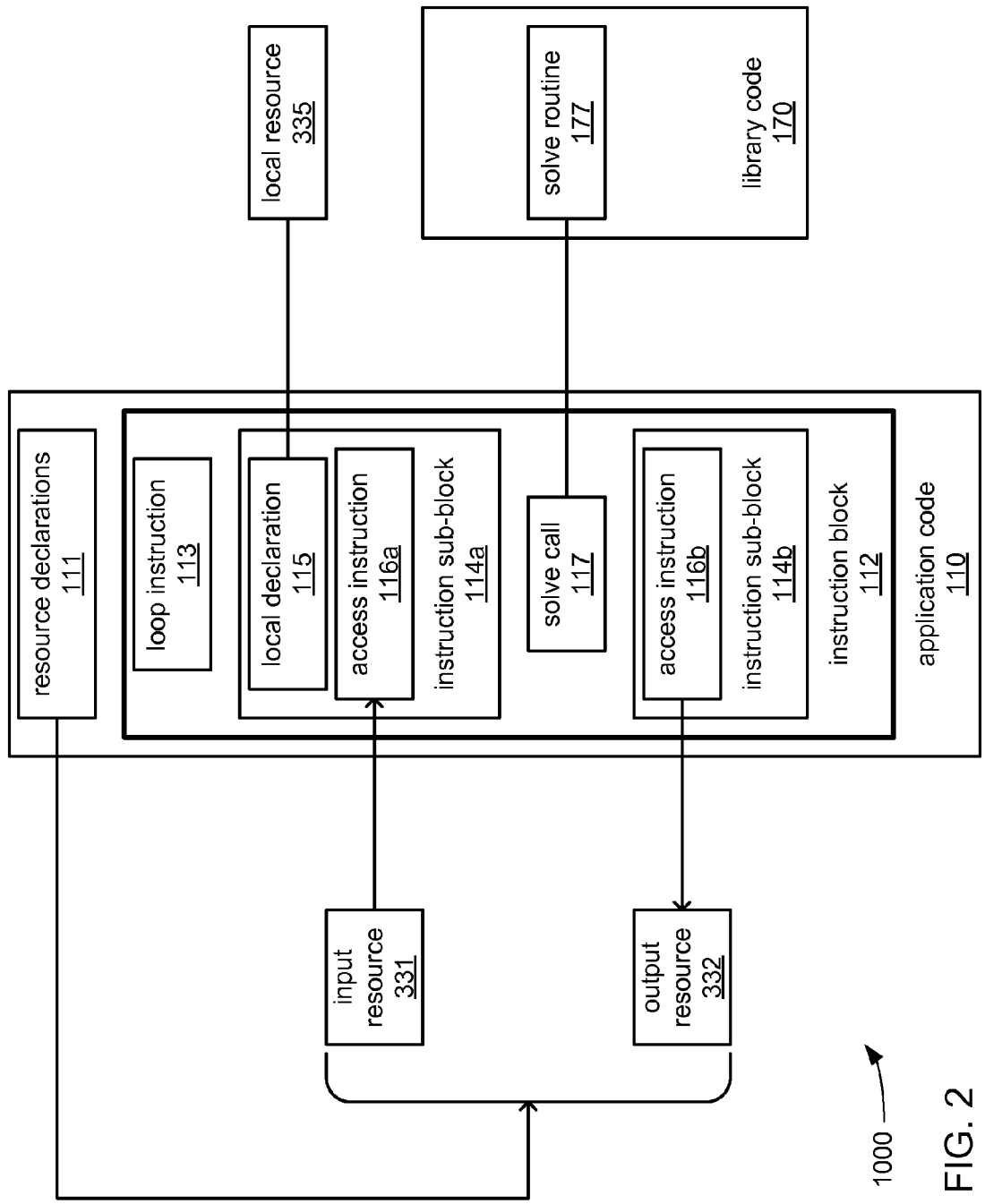
FIG. 2 illustrates an example of an embodiment of application code.

FIG. 2 illustrates an example of a block of instructions 112 within the application code 110 that define such a loop. As depicted, the instruction block 112 includes a loop instruction 113, instruction sub-blocks 114a and 114b, and a solve call 117. The loop instruction 113 may be an altered version of a loop instruction that causes the sequential execution of loops in any of a variety of programming languages, the altered version providing an indication of the ability of at least a portion of the instruction block 112 to be executed concurrently. By way of example, the loop instruction may be a "cofor" instruction (e.g., an abbreviation of "concurrent for") that is used in place of a "for" instruction to denote a for loop of which the iterations of the loops are able to be executed at least partly concurrently, instead of entirely sequentially as would result from the use of the "for" instruction.

As depicted in FIG. 2, the solve call 117 includes an instruction calling a solve routine 177 of the library code 170. Although the solve routine 177 may be any of a variety of possible routines to perform any of a variety of calculation and/or search functions depending on the nature of the application code 110, it is envisioned that the solve routine 177 tends to perform a function that takes substantially more time to execute than the instructions of either of the sub-blocks 114a or 114b. Stated differently, it is envisioned that the majority of the time to execute each iteration of the loop defined by the instruction block 112 is taken by the time required to execute the solve routine 177. This may be due, for example, to the solve routine 177 performing operations requiring extensive use of a network (e.g., the network 999) such that significant network access delays are incurred, and/or this may be due, for example, to the solve routine 177 performing highly complex calculations.

The instruction sub-block 114a may incorporate one or more instructions to perform "pre-processing" to retrieve data and/or perform other functions in preparation for the call to the solve routine 177 made by the solve call 117. This may include an access instruction 116a to retrieve data from an input resource 331 that is shared by all iterations of the loop defined by the instruction block 112. Correspondingly, the instruction sub-block 114b may incorporate one or more instructions to perform "post-processing" to output data and/or perform other functions following the return from the solve routine 177 called by the solve call 117. This may include an access instruction 116b to output data to an output resource 332 that is shared by all iterations of the loop defined by the instruction block 112.

It is envisioned that the library code 170, along with a compiler or interpreter capable of recognizing the loop instruction 113 as indicating a concurrently executable loop, is provided to persons seeking to write application code to solve large scale problems (e.g., the application code 110) to enable them to do so without an in-depth understanding of principles of concurrent processing. In essence, such persons would be able to define the calculations to be performed through the selection of an appropriate solve routine (e.g., the solve routine 177) and/or through the passing of parameters in a call to a solve routine (e.g., in the solve call 117). The solve routine 177 of the library code 170 having been written specifically for concurrent execution enables at least its execution to be performed concurrently, while the instructions of the instruction sub-blocks 114a and 114b, which may have been written by persons less skilled in writing code for concurrent execution, may be executed sequentially in an order that avoids (or at least mitigates) the occurrence of errors arising from concurrent execution.

In other words, those writing the application code 110 are relieved of the "heavy lifting" of attempting to correctly write concurrently executable code by being provided with the option to use an alternate version of a loop instruction (e.g., the loop instruction 113) and callable solve routines of a library (e.g., the library code 170) such that substantially all of the intricacies of concurrent execution are automatically done for them. The use of the loop instruction 113 provides an indication to the parsing component of a compiler or interpreter that concurrent execution is intended, and the use of the solve call 117 to the solve routine 177 effects a jump to yield control of execution to code designed for concurrent execution. In this way, those writing the application code 110 are able to obtain the advantages of concurrent execution with minimal added or altered syntax over what they would write to employ only sequential execution.

The input resource 331 and the output resource 332 may each be any of a variety of types of resource, including and not limited to, storage locations within a storage, input and/or output devices, data files and/or another form of data structure. By way of example, the input resource 331 may be a data structure in which pieces of input data representing parameters for use in iterations of the solve call 117 may be stored (e.g., an input data file). Also by way of example, the output resource 332 may be a printer or other output device to which results of whatever processing is performed by the solve routine 177 in each concurrently executed iteration are transmitted. As will be explained in greater detail, the input resource 331 may include data that must be retrieved in a particular order by iterations of the loop defined by the instruction block 112 to ensure that each iteration is provided with the data intended for it. Correspondingly, the output resource 332 may be required to be supplied with data in a particular order by iterations of the loop. Depending on the selection of programming language in which the application code 110 is written and/or the nature of the input resource 331 and/or the output resource 332, the application code 110 may include resource declarations 111 for one or more of these resources.

One or more instruction sub-blocks of the instruction block 112 may include a declaration instruction or other mechanism to define one or more local resources (e.g., local variables) during the execution of each iteration of the loop defined by the instructions of the instruction block 112. By way of example, the instruction sub-block 114a may include a local declaration 115 of a local resource 335 that causes a separate instance of the local resource 335 to be instantiated for each iteration of the loop and to exist only during the execution of each iteration.

Upon identifying the loop instruction 113 as a loop instruction indicating that the instruction block 112 defines a loop of which iterations are able to be executed at least partly concurrently, the processor component 150 is further caused by a parsing component of the control routine 140 to parse the instructions of the instruction block 112 to distinguish the solve call 117 from the instruction sub-blocks 114a and 114b. The processor component 150 then inserts one or more coordinating instructions into at least the sub-block 114a to enforce sequential execution of at least the sub-block 114a across multiple iterations of the loop.

FIGS. 3A, 3B, 3C, 3D and 3E illustrate examples of insertion of coordinating instructions into one or more instruction sub-blocks of the instruction block 112 to enforce an order of execution of one or more of instruction sub-blocks across three iterations 312x, 312y and 312z of the loop defined by the instructions of the instruction block 112. FIGS. 3A-E also depict the resulting temporal order of execution of those instruction sub-blocks, as time progresses along the indicated axis. It should be noted that the specific depiction of just three iterations of the loop defined within the instruction block 112 is but an example presented herein to facilitate understanding. Any of a variety of other quantities of iterations may be generated, and it is envisioned as likely that a far greater number of iterations than three would be generated.

It should also be noted for the sake of understanding that if the loop instruction 113 providing the indication of the possibility of concurrent execution were to be replaced by a loop instruction that provides no such indication, then the processor component 150 would compile the instructions of the instruction block 112 to effect a sequential execution of iterations of the loop, and the three iterations 312x, 312y and 312z of the loop would be performed sequentially in that order. In other words, with a loop instruction indicative of sequential execution of loop iterations in place of the loop instruction 113 (e.g., with a "for" instruction in place of a "cofor" instruction), a sequential execution of the loop defined by the instructions of the instruction block 112 would occur in which the iteration 312x would be fully executed before the iteration 312y would be executed, and the iteration 312y would be fully executed before the iteration 312z would be executed. Thus, with a loop instruction indicative of only sequential execution of loop iterations in place, the instruction sub-blocks 114a and 114b of the iteration 312x would be executed before their counterparts of the iteration 312y, and their counterparts of the iteration 312y would be executed before their counterparts of the iteration 312z.

Figure 3A:
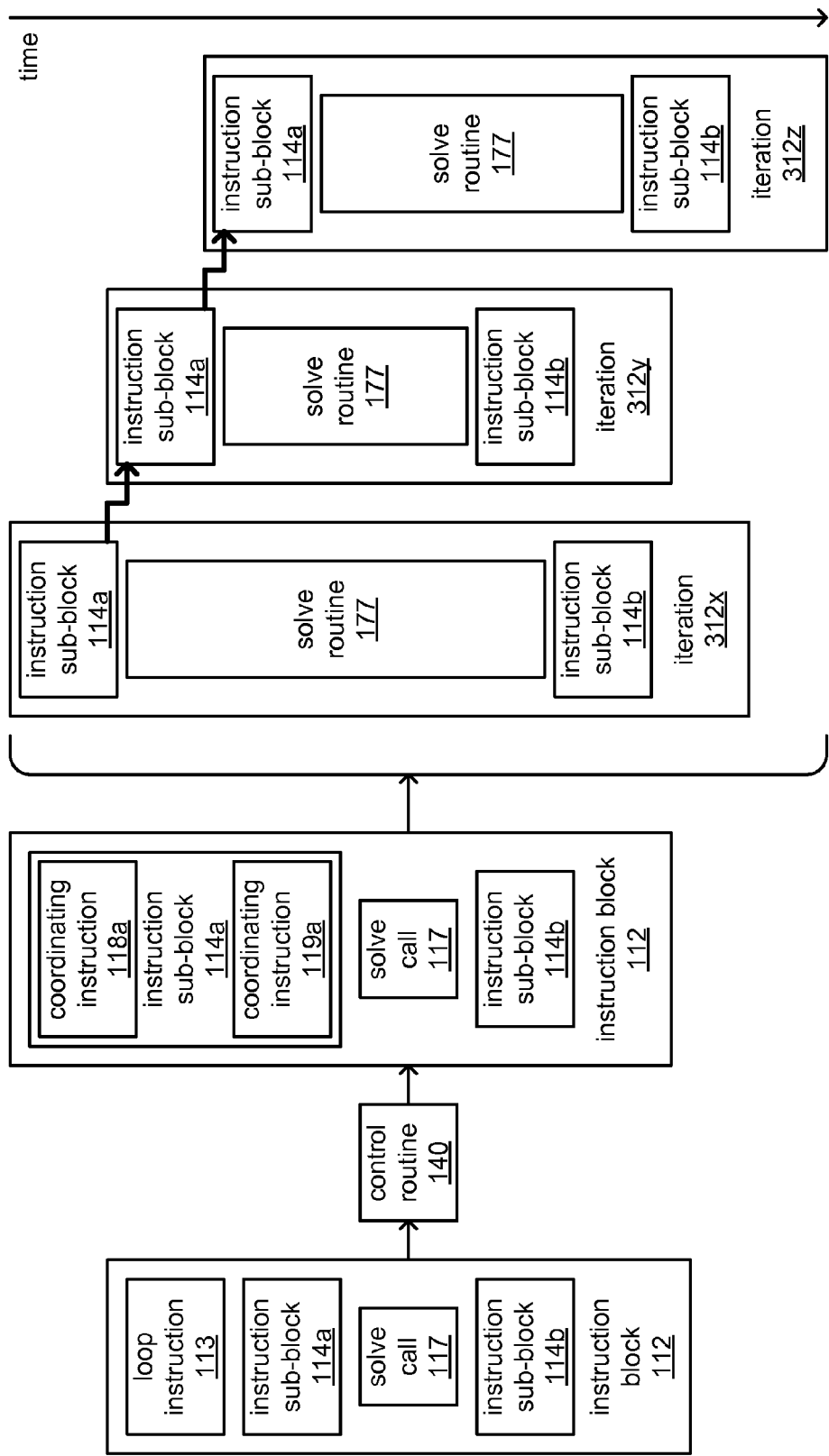
FIGS. 3A-E illustrate examples of embodiments of ordering execution of instructions among iterations of a loop.

Turning to FIG. 3A, the processor component 150, in compiling the instruction block 112, inserts a coordinating instruction 118a towards the beginning of the instruction sub-block 114a, and inserts a coordinating instruction 119a towards the end of the instruction sub-block 114a. As depicted, this enables coordination in the execution of the instruction sub-block 114a among the iterations 312x-z such that execution of the instruction sub-block 114a of the iteration 312x must be completed before execution of the instruction sub-block 114a of the iteration 312y may begin, and execution of the instruction sub-block 114a of the iteration 3127 must be completed before execution of the instruction sub-block 114a of the iteration 312z may begin. In essence, execution of the sub-block 114a among the iterations 312x-z is caused to occur in the same order in which it would occur were the iterations 312x-z to be executed sequentially.

Regardless of the exact mechanism employed to enforce this order of execution of the instruction sub-block 114a among the iterations 312x-z, the enforcing of this order may be deemed desirable in embodiments in which the instruction sub-block 114a includes an instruction to access a resource providing input data for each of the iterations 312x-z and from which that data must be retrieved in a particular order for each iteration to be provided with the correct data. For example, where the instruction sub-block 114a includes the access instruction 116a to retrieve data from the input resource 331, and where the data is organized within the input resource 331 such that it must be retrieved first for the iteration 312x, then for the iteration 312y and then for the iteration 312z, the enforcing of this order of execution of the instruction sub-block 114a among these iterations ensures that the data is retrieved in that correct order.

Figure 3B:
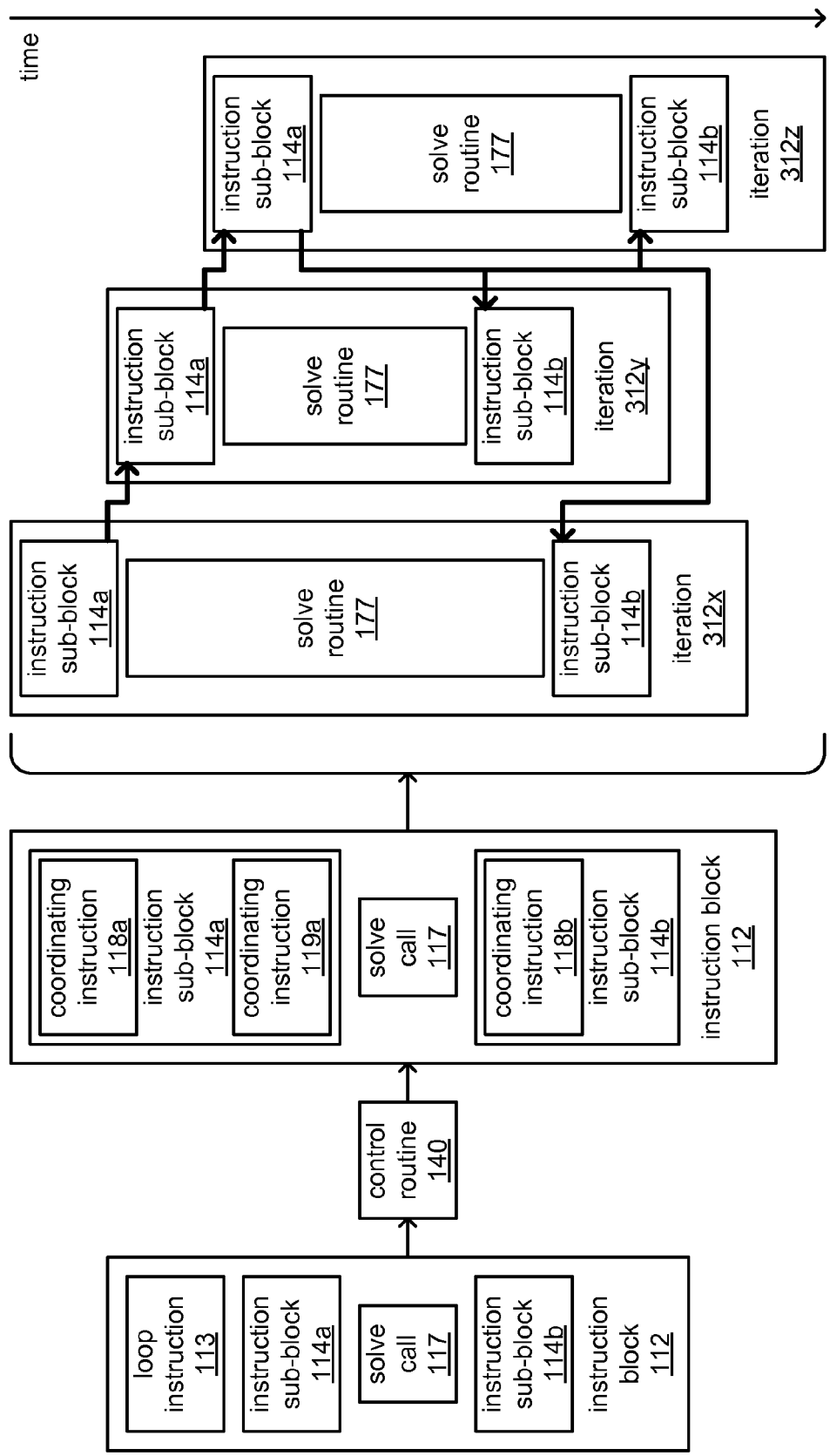

Turning to FIG. 3B, the processor component 150 additionally inserts a coordinating instruction 118b towards the beginning of the instruction sub-block 114b. As depicted, this enables additional coordination between the execution of the instruction sub-blocks 114a and 114b such that execution of the instruction sub-block 114a across all of the iterations 312x-z must be completed before execution of the instruction sub-block 114b of any of the iterations 312x-z may begin.

The enforcing of completion of this order of execution between the instruction sub-block 114a and the instruction sub-block 114b may be deemed desirable in embodiments in which data is both retrieved from and written to a common resource, and it is desired to perform the retrieval of all data from that common resource before any of that data is overwritten. For example, where the input resource 331 and the output resource 332 are one and the same resource, the instruction sub-block 114a includes the access instruction 116a to retrieve data from that single resource and the instruction sub-block 114b includes the access instruction 116b to write data to that single resource, the enforcing of this order of execution ensures that all retrieval of data from that single resource is completed before any of that data is overwritten.

Figure 3C:
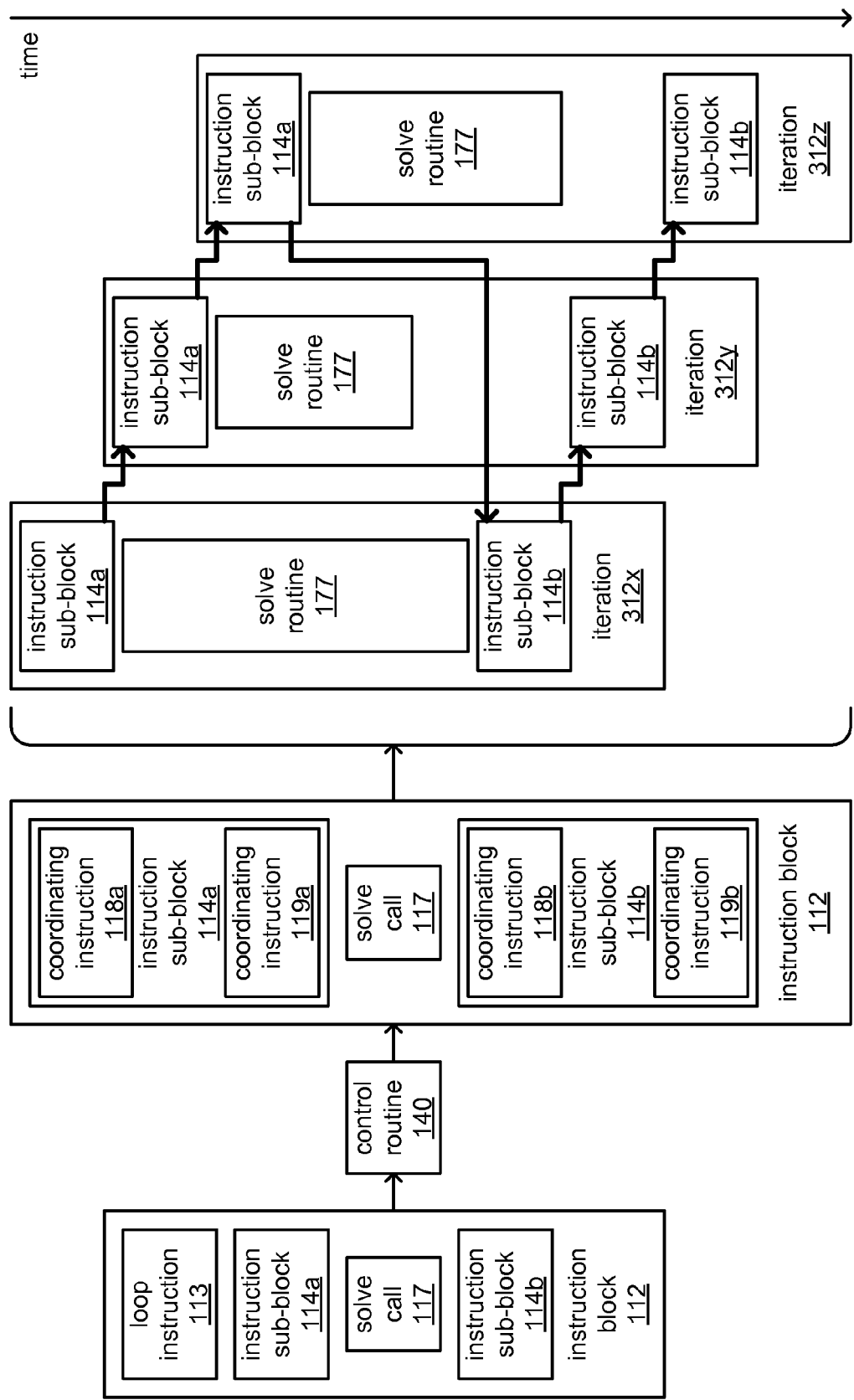

Turning to FIG. 3C, the processor component 150 additionally inserts a coordinating instruction 119b towards the end of the instruction sub-block 114b. As depicted in FIG. 3C, this enables additional coordination in the execution of the instruction sub-block 114b among the iterations 312x-z such that execution of the instruction sub-block 114b of the iteration 312x must be completed before execution of the instruction sub-block 114b of the iteration 312y may begin, and execution of the instruction sub-block 114b of the iteration 312y must be completed before execution of the instruction sub-block 114b of the iteration 312z may begin. In essence, execution of the sub-block 114b among the iterations 312x-z is caused to occur in the same order in which it would occur were the iterations 312x-z to be executed sequentially.

The enforcing of this order may be deemed desirable in embodiments in which the instruction sub-block 114b includes an instruction to access a resource to write data thereto where that data must be provided to that resource in a particular order. For example, where the instruction sub-block 114b includes the access instruction 116b to write data to the output resource 332, and where the data must be written to the output resource 331 first by the iteration 312x, then by the iteration 312y and then by the iteration 312z, the enforcing of this order of execution of the instruction sub-block 114b among these iterations ensures that the data is written in the correct order.

Figure 3D:
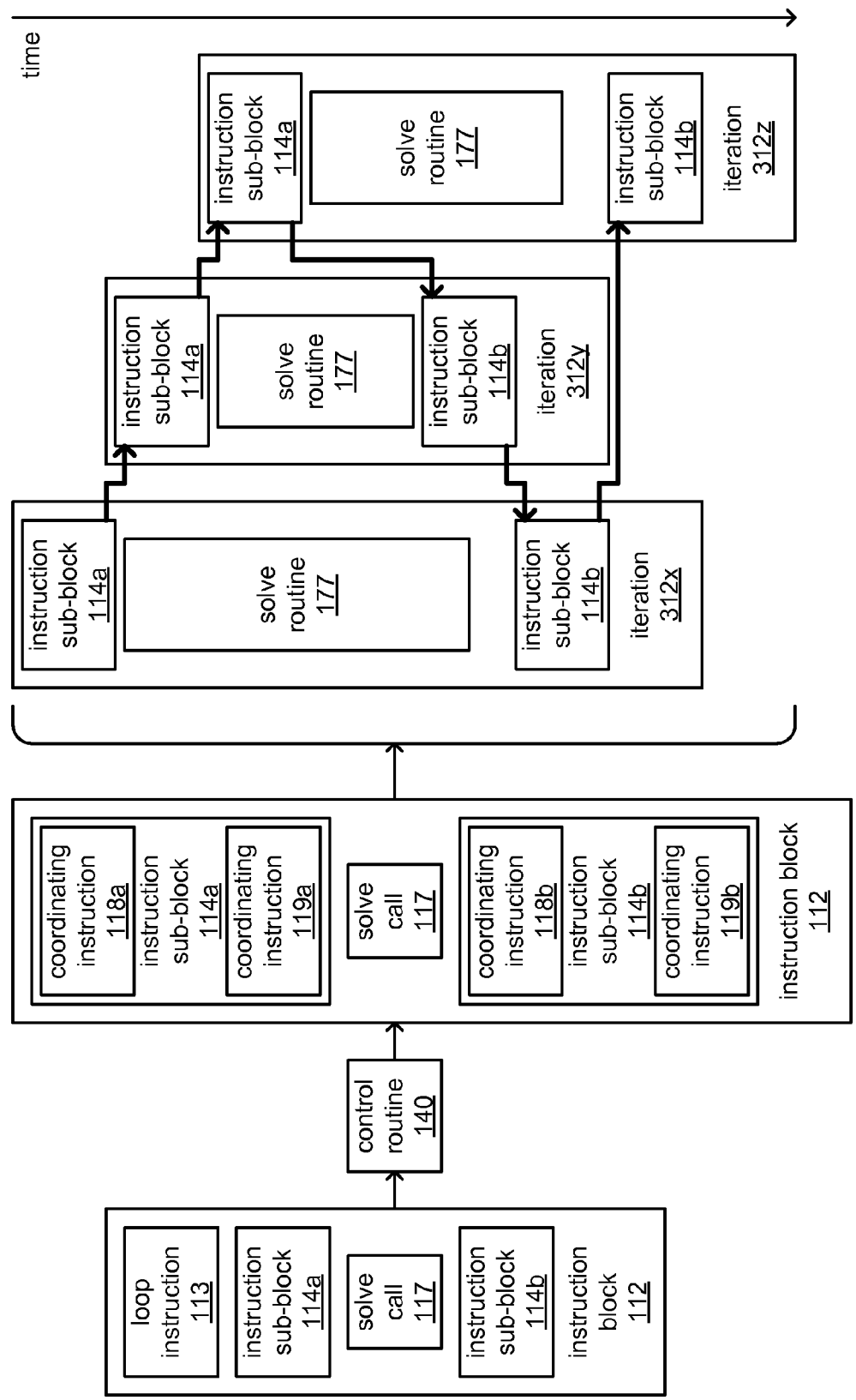

Turning to FIG. 3D, like FIG. 3C, the processor component 150 inserts the coordinating instructions 118a and 119a into the instruction sub-block 114a, and inserts the coordinating instructions 118b and 119b into the instruction sub-block 114b. However, the coordinating instructions 118b and 119b are used to provide a different type of coordination in the example of FIG. 3D than in the example of FIG. 3C. As depicted in FIG. 3D, the instruction sub-block 114b is executed sequentially across the iterations 312x-z, but the order of the sequential execution is determined by the order in which the solve routines 177 of the iterations 312x-z are completed. In other words, the instruction sub-block 114b of only one of the iterations 312x-z is executed at a time. However, the order in which the instruction sub-block 114b in each of the iterations 312x-z is executed is opportunistically determined by the order in which the solve routine 177 in each of the iterations 312x-z completes execution, and is therefore not determined in advance of the execution of the iterations 312x-z.

The use of such an opportunistic order may be deemed desirable in embodiments in which the instruction sub-block 114b need not be executed in any particular order across the iterations 312x-z, and in which the amount of time required to execute the solve routine 177 may vary significantly across the iterations 312x-z. Such significant variation in the execution time of the solve routine 177 may lead to lengthy periods of time expended in waiting to begin execution of the instruction sub-block 114b in one or more of the iterations 312x-z if the sub-block 114b were required to be executed in a particular order across the iterations 312x-z.

Figure 3E:
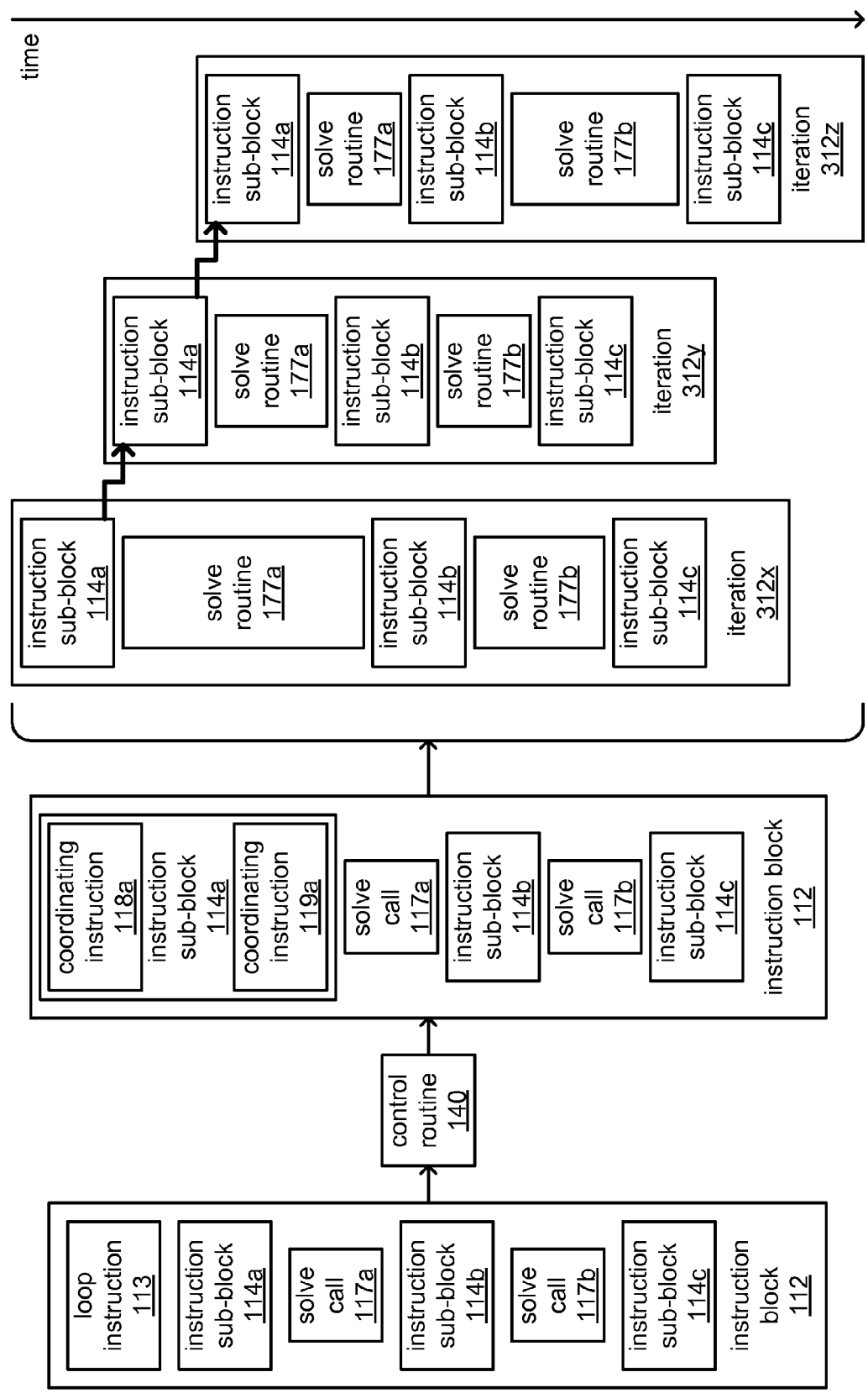

Turning to FIG. 3E, the instruction block 112 differs from those of FIGS. 3A-D in that the instruction block 112 of FIG. 3E includes more than one solve call, specifically a pair of solve calls 117a and 117b (calling to solve routines 177a and 177b, respectively), rather than the single solve call 117 of the instruction block 112 of FIGS. 3A-D. The instruction block 112 of FIG. 3E also includes at least one more instruction sub-block 114c than is included in the instruction block 112 of FIGS. 3A-D. As depicted, the processor component 150, in compiling the instruction block 112, may only insert a coordinating instruction 118a towards the beginning of the instruction sub-block 114a and a coordinating instruction 119a towards the end of the instruction sub-block 114a. Doing so enables a similar degree of coordination in the execution of the instruction sub-block 114a among the iterations 312x-z as depicted in FIG. 3A. The result, as depicted in FIG. 3E and quite similar to what is also depicted in FIG. 3A, the order in which execution of the iterations 312x, 312y and 312z ceases may not be the same as the order in which the execution of these iterations began.

However, in a manner not unlike what is depicted in FIGS. 3B, 3C and/or 3D, further coordinating instructions could be inserted in much the same manner into one or both of the instruction sub-blocks 114b and/or 114c. Thus, the execution of a later one of the instruction sub-blocks 114a-c in any of the iterations 312x-z may be caused to be forestalled until the execution of an earlier one of the instruction sub-blocks 114a-c in all of these iterations has completed. Alternatively or additionally, the execution of any one of the instruction sub-blocks 114a-c may be caused to occur sequentially across the iterations 312x-z.

It should be noted that despite there being only a pair of the solve calls 117a and 117b depicted in the instruction block 112 in FIG. 3E, other embodiments are possible in which the instruction block 112 includes still more solve calls. Further, embodiments are possible in which one or more instruction sub-blocks between solve calls include conditional branch instructions that may dynamically determine whether one or more solve calls are executed in each iteration. As a result, the flow of execution may differ between iterations such that different solve calls are executed between iterations.

It should be noted that, as depicted in FIGS. 3A-E, the length of time required for the execution of one of the solve routines 177, 177a or 177b may differ across iterations. It should also be noted that the depictions of the relative lengths of time required for the execution of the solve routines 177, 177a and 177b versus the instruction sub-blocks 114a, 114b and 114c may not be to scale in FIGS. 3A-E. Again, it is envisioned that a substantial proportion of the time required to execute each iteration of the loop defined by the instructions of the instruction block 112 may be taken by the time required to execute the solve routine 177 (or the solve routines 177a and 177b).

Returning to FIG. 2, upon identifying the loop instruction 113 as a loop instruction indicating that the instruction block 112 defines a loop amenable to concurrent execution, the processor component 150 may be further caused by a parsing component of the control routine 140 to parse the instructions of the instruction block 112 to identify data structures and/or other local resources that are instantiated during execution of the loop. Upon identifying an instruction to instantiate such a local resource (e.g., the local declaration 115 to instantiate the local resource 335), the processor component 150 may modify that instruction to cause each concurrently executed iteration of the loop to have a separate version of that local resource. Depending on the syntax and/or other characteristics of the programming language used in writing the application code 110, such modification of such an instruction may be necessary to ensure that multiple iterations do not interfere with each other as a result of sharing a local resource.

Returning to FIG. 1, in various embodiments, the computing device 300 incorporates one or more of a processor component 350, a storage 360 and an interface 390 to couple the computing device 300 to the network 999. The processor component 350 may incorporate multiple cores 355 enabling concurrent execution of multiple threads by the processor component 350. The storage 360 stores one or more of the application code 110, the library code 170 and a control routine 340. As previously discussed, one or both of the input resource 331 and the output resource 332 may be data structures. In such embodiments, one or both of the input resource 331 and the output resource 332 may also be stored in the storage 360. The control routine 340 incorporates a sequence of instructions operative on the processor component 350 to implement logic to perform various functions.

As previously discussed, some embodiments of the concurrent processing system 1000 may include the compiling device 100 to compile the application code 110. In such embodiments, the computing device 300 may receive the application code 110 in compiled form from the compiling device 100 via the network 999. However, in other embodiments in which the compiling device 100 may not be present, the processor component 350 may be caused, by its execution of the control routine 340, to compile the application code 110 in lieu of the compiling device 100 doing so. In still other embodiments, the application code 110 may not be compiled at all prior to being executed. Instead, the processor component 350 may be caused, by its execution of the control routine 340, to interpret the application code 110 as part of executing the application code 110.

In embodiments in which the processor component 350 is caused to either compile or interpret the application code 110, the processor component 350 may be caused by execution of the control routine 340 to parse the instructions making up the application code 110 in much the same way that the processor component 150 has been described as doing so at length, above. Stated differently, it may be the processor component 350, rather than the processor component 150, that identifies the loop instruction 113 as a type of loop instruction that indicates that iterations of at least a portion of the loop of the instruction block 112 is able to be executed concurrently. It may also be the processor component 350 that inserts coordinating instructions into one or more instruction sub-blocks of the instruction block 112 to enforce an order of execution of at least one instruction sub-block across multiple iterations of the loop defined by the instructions of the instruction block 112. It may further be the processor component 350 that modifies the local declaration 115 to ensure that separate instances of the local resource 335 are instantiated for each iteration. Regardless of whether the application code 110 is compiled before execution or is interpreted during execution, the processor component 350 is caused by execution of the control routine 340 to instantiate the multiple concurrently executed iterations of the loop defined by the instructions of the instruction block 112, and to allocate those iterations among multiple threads to enable such concurrent execution.

Figure 4:
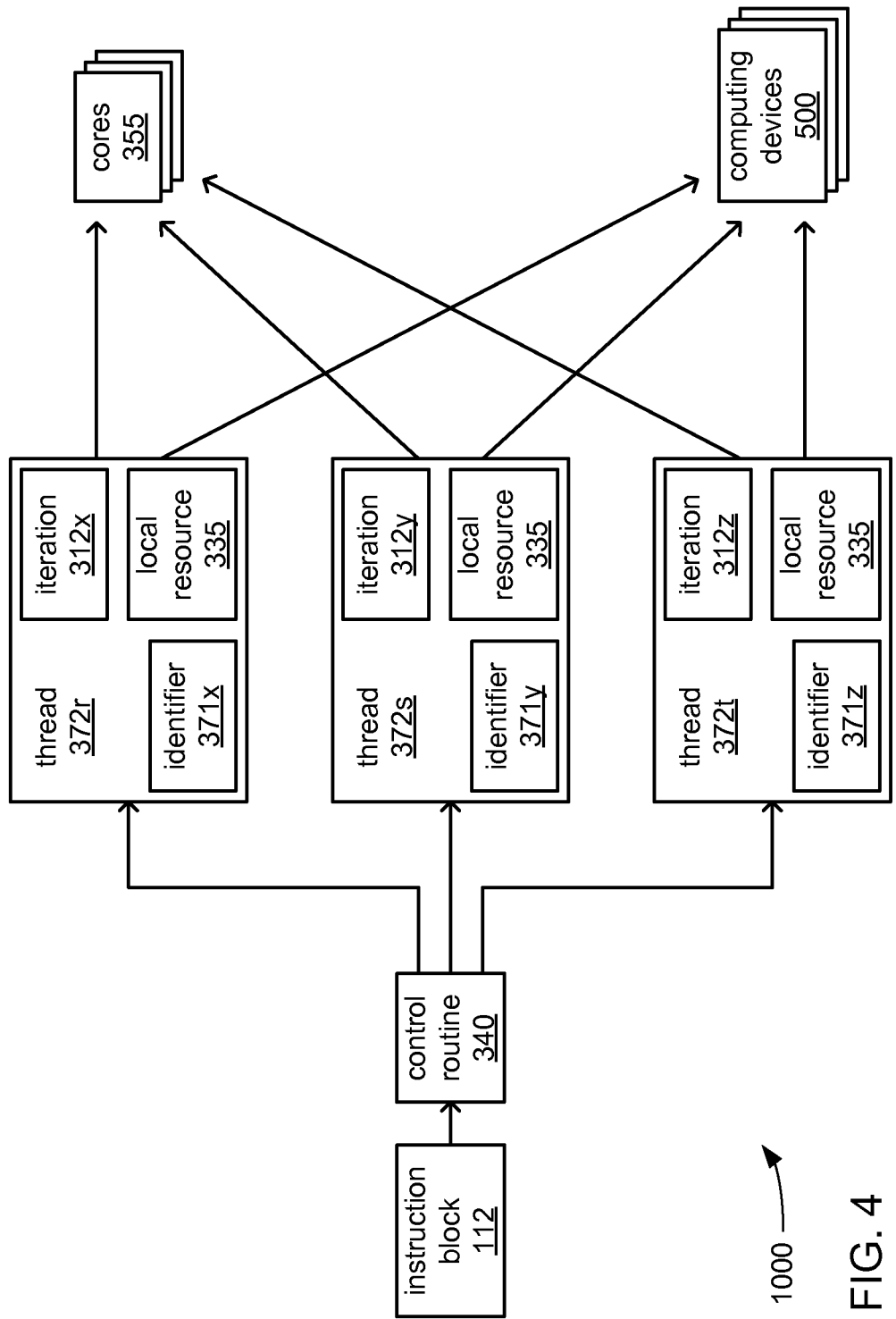
FIG. 4 illustrates an example of an embodiment of allocation of iterations of a loop among threads.

FIG. 4 illustrates an example of allocation of the iterations 312$x$, 312$y$ and 312$z$ (introduced in FIGS. 3A-E) among threads 372$r$, 372$s$ and 372$t$, respectively, by the processor component 350 in executing the control routine 340. As has been discussed, in some embodiments, the iterations 312$x$-$z$ may be executed by multiple cores 355 of the processor component 350 of the computing device 300. In other embodiments, the iterations 312$x$-$z$ may be distributed among multiple ones of the computing devices 500 to be executed by the processor components 550 thereof, as coordinated by the computing device 300. Thus, in some embodiments, the threads 372$r$-$t$ may be distributed among different ones of the cores 355 of the processor component 350, while in other embodiments, the threads 372$r$-$t$ may be distributed among the processor components 550 of one or more of the computing devices 500. As also depicted, separate instances of the local resource 335 are generated for each of the iterations 312$x$-$z$ as they are separately executed on the threads 372$r$-$t$, respectively.

It should again be noted that only three iterations 312$x$-$z$ are depicted in FIG. 3A-D and in FIG. 4 as a simplified example to facilitate understanding, and it is envisioned that there may be a great many iterations. Indeed, embodiments are possible in which the quantity of iterations greatly outnumbers the quantity of available threads such that only a subset of the iterations are able to be concurrently executed at any given time. In such embodiments, as execution of each iteration is completed, another iteration may be allocated to the thread to which the just completed iteration was allocated.

In distributing the iterations 312$x$-$z$ among the threads 372$r$-$t$, the processor component 350 may assign unique identifiers 371$x$-$z$ to each of the iterations 312$x$-$z$, respectively. The unique identifiers 371$x$-$z$ may be employed by the coordinating instructions 118$a$-$b$ and 119$a$-$b$ of each of the iterations 312$x$-$z$ to refer to the others of the iterations 312$x$-$z$. By way of example (and referring to any of FIGS. 3A-E), the coordinating instruction 118$a$ of the instruction sub-block 114$a$ of the iteration 312$y$ may be given the unique identifier 371$x$ of the iteration 312$x$ to use in indicating that execution of the sub-block 114$a$ of the iteration 312$x$ must be completed before execution of the sub-block 114$a$ of the iteration 312$y$ may begin. Correspondingly, the coordinating instruction 119$a$ of the instruction sub-block 114$a$ of the iteration 312$y$ may be given the unique identifier 371$z$ of the iteration 312$z$ to use in indicating that execution of the sub-block 114$a$ of the iteration 312$z$ cannot begin until execution of the sub-block 114$a$ of the iteration 312$y$ has completed. This is but one possible example of the manner in which the execution of instruction sub-blocks across iterations of a loop may be coordinated. Other mechanisms to effect such coordination that may or may not entail the use of identifiers associated with each iteration may be employed in other embodiments.

In various embodiments that include the computing devices 500, each of the computing devices 500 incorporates at least one processor component 550 to execute one or more iterations of the loop defined by the instruction block 112 of the application code 110 as described. Further, each of the computing devices 500 also incorporates an interface 590 to couple the computing devices 500 to the network 999 to enable coordination of the execution of such iterations with the computing device 300 as described.

Figure 5:
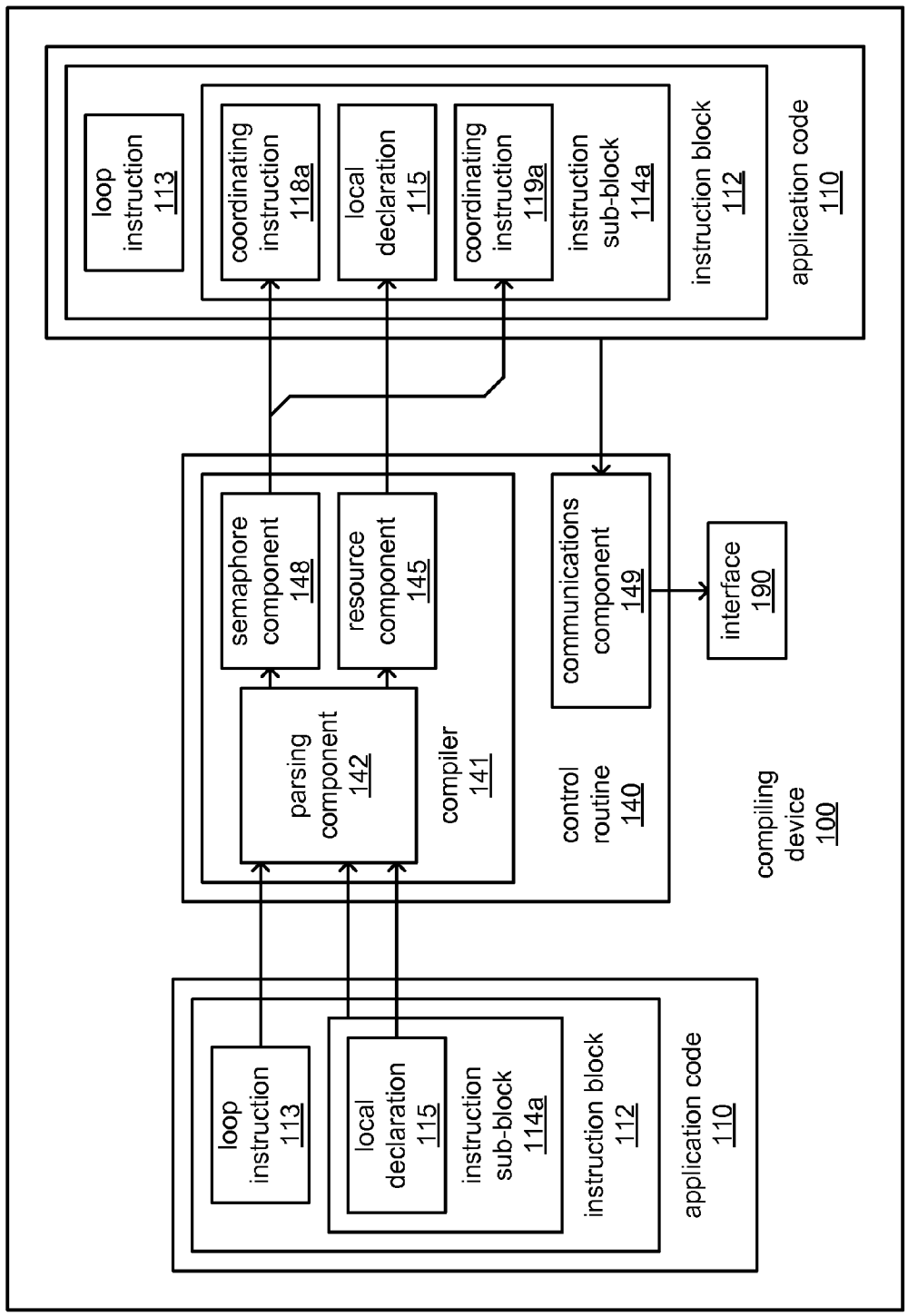
FIGS. 5, 6 and 7 illustrate examples of embodiments of operating environments for portions of a concurrent processing system.
Figure 6:
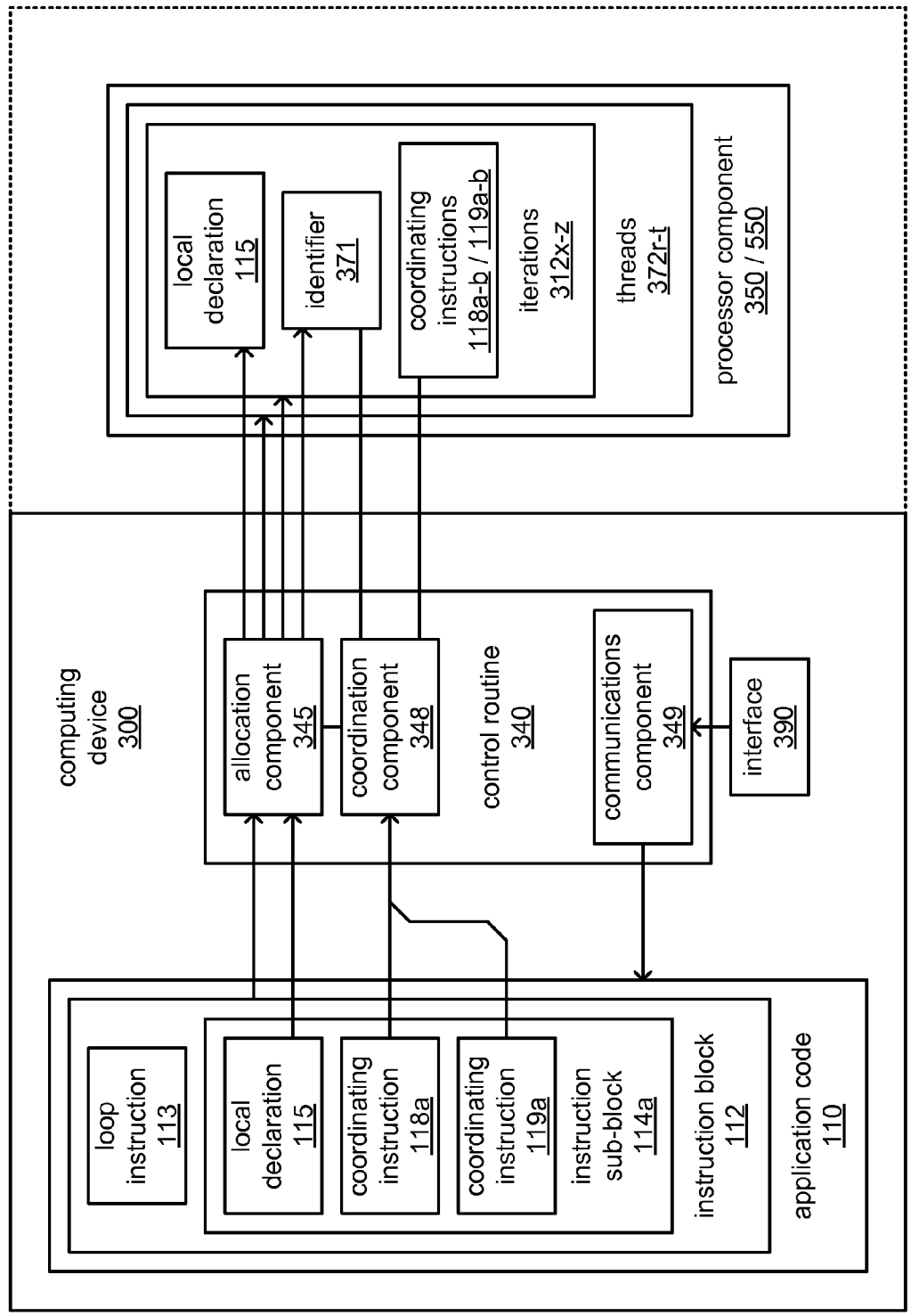
Figure 7:
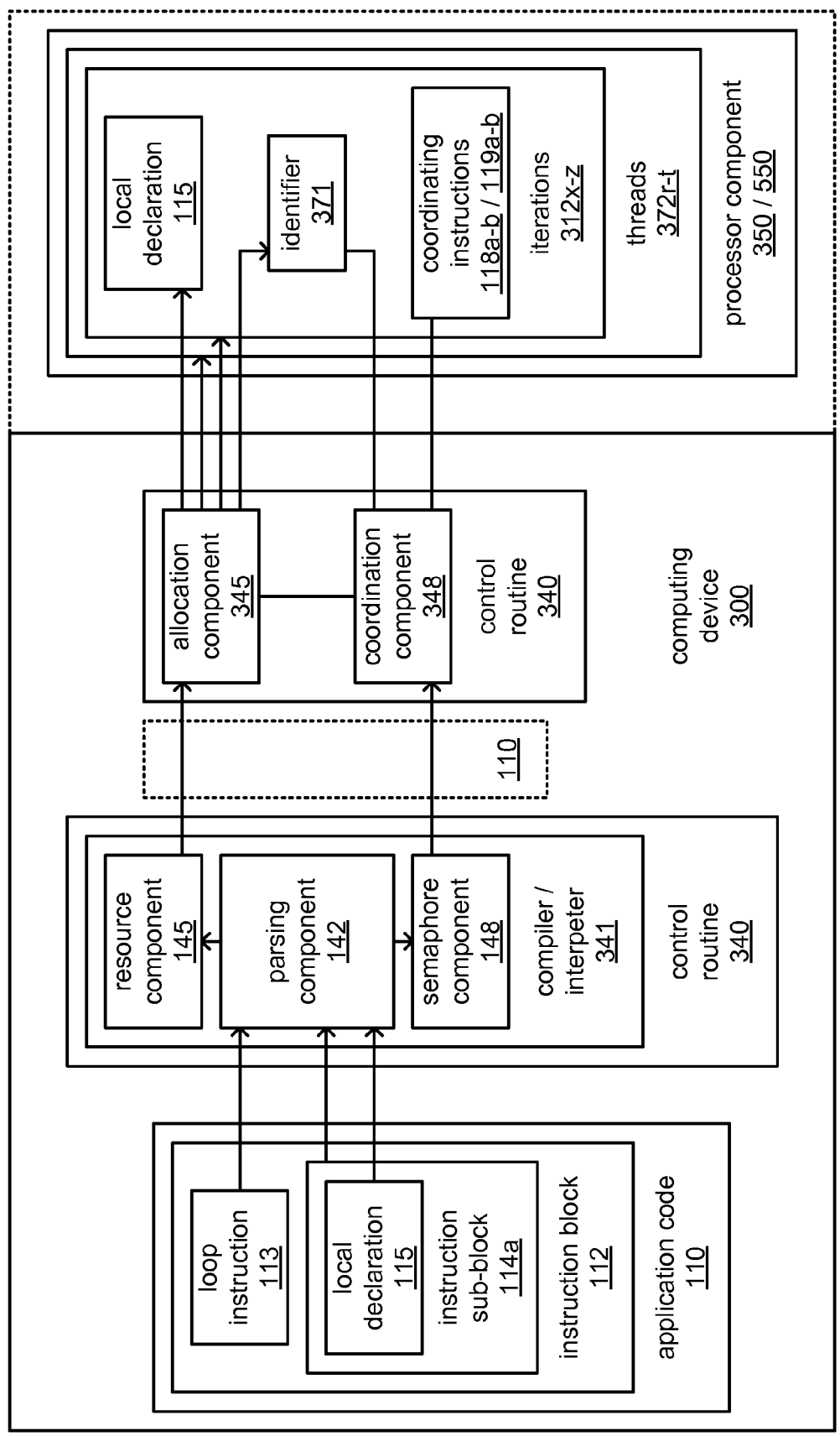

FIGS. 5, 6 and 7 each illustrate a block diagram of an example portion of an embodiment of the concurrent processing system 1000 of FIG. 1 in greater detail. More specifically, FIG. 5 depicts aspects of the operating environment of the compiling device 100 in which the processor component 150, in executing the control routine 140, may compile the application code 110 for subsequent execution by the computing devices 300 and/or 500. FIG. 6 depicts aspects of the operating environment of one embodiment of the computing device 300 in which the processor component 350, in executing the control routine 340, allocates multiple iterations of a loop of the application code 110 among multiple threads. Those threads may be executed either by cores 355 of the processor component 350 or by one or more cores of the processor component 550 of one or more of the computing devices 500. FIG. 7 depicts aspects of the operating environment of an alternate embodiment of the computing device 300 in which the processor component 350, in executing the control routine 340, compiles or interprets the application code 110 either during execution or in preparation for subsequent execution.

As recognizable to those skilled in the art, the control routines 140 and 340, including the components of which each is composed, are selected to be operative on whatever type of processor or processors that are selected to implement applicable ones of the processor components 150 or 350. In various embodiments, each of the control routines 140 and 340 may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor components 150 or 350. Where one or more device drivers are included, those device drivers may provide support for any of a variety of other components, whether hardware or software components, of corresponding ones of the computing devices 100 or 300.

Each of the control routines 140 or 340 may include a communications component 149 or 349 executable by the processor component 150 or 350 to operate the interface 190 or 390, respectively, to communicate via the network 999 as has been described. Such communications may convey the application code 110 and/or the library code 170 in compiled or non-compiled form among the computing devices 100 and 300 via the network 999. As will be recognized by those skilled in the art, these communications components are selected to be operable with whatever type of interface technology is selected to implement corresponding ones of the interfaces 190 and 390. Correspondingly, the computing devices 500 may include a communications component (not shown) executable by the processor component 550 to operate the interface 590 to also communicate via the network 999, including communications to coordinate execution of iterations of a loop by the processor component 550 of one or more of the computing devices 500.

Turning more specifically to FIG. 5, the control routine 140 may include a compiler 141 executable by the processor component 150 to compile at least the instruction block 112 of the application code 110 for execution by the cores 355 of the processor component 350 and/or one or more cores of the processor component 550 of one or more of the computing devices 500. Thus, there may be more than one of the compiler 141 to compile at least the instruction block 112 for more than one type of processor component in embodiments in which the processor components 350 and 550 may be of different types.

The control routine 140 may include a parsing component 142 executable by the processor component 150 to parse the instructions of the application code 110. In parsing the application code 110, the parsing component 142 may identify a loop instruction indicative of a block of instructions (e.g., the instruction block 112) that defines a loop amenable to concurrent execution of multiple iterations of the loop. In identifying such a loop instruction, the parsing component 142 may distinguish such a loop instruction from another loop instruction that does not provide an indication of a block of instructions defining a loop amenable to concurrent execution. Within such an instruction block, the parsing component 142 may identify at least one sub-block of instructions (e.g., the instruction sub-block 114a) to be executed sequentially across multiple concurrently executed iterations of the loop. Within such an instruction block, the parsing component 142 may also identify at least one instruction associated with a local resource of the loop. As depicted, the parsing component 142 may be a component of the compiler 141.

The control routine 140 may include a semaphore component 148 executable by the processor component 150 to insert one or more coordinating instructions (e.g., one or more of the coordinating instructions 118a or 119a) toward the beginning and/or toward the end of a sub-block of instructions to be executed sequentially across multiple iterations of the loop. The semaphore component 148 may do this in response to the identification of that instruction sub-block by the parsing component 142. As has been discussed, the insertion of such coordinating instructions may be one possible semaphore mechanism to effect the sequential execution of such an instruction sub-block across multiple iterations of the loop. However, as has also been discussed, other mechanisms to effect such sequential execution may be employed in other embodiments. As depicted, the semaphore component 145 may be a component of the compiler 141.

The control routine 140 may include a resource component 145 executable by the processor component 150 to modify a local declaration of a local resource (e.g., the local declaration 115 associated with the local resource 335) to create separate instances of the local resource for each iteration of the loop. As depicted, the resource component 145 may be a component of the compiler 141.

Turning more specifically to FIG. 6, the control routine 340 may include an allocation component 345 executable by the processor component 350 to allocate iterations of a concurrently executable loop (e.g., the iterations 312x-z of the loop defined by the instructions of the instruction block 112) among multiple threads (e.g., the threads 372r-t). As previously discussed, such threads may be executed by the cores 355 of the processor component 350 and/or by one or more cores of the processor component 550 of one or more of the computing devices 500. In making such allocations, the allocation component 345 may assign a unique identifier (e.g., the identifier 371) to each iteration of the loop. As previously discussed, such unique identifiers may be employed in semaphores or another mechanism in effecting sequential execution of one or more instruction sub-blocks. Also, in making such allocations, the allocation component 345 may allocate separate instances of a local resource associated with a local declaration for each iteration of the loop (e.g., the local resource 335 associated with the local declaration 115).

The control routine 340 may include a coordination component 348 executable by the processor component 350 to coordinate the sequential execution of one or more instruction sub-blocks across multiple iterations of the loop. Again, as previously discussed, this may entail the use of coordinating instructions inserted into such instruction sub-blocks and unique identifiers assigned to each iteration.

Turning more specifically to FIG. 7, the alternate embodiment of the computing device 300 depicted therein is substantially similar to the embodiment of the computing device 300 depicted in FIG. 6, with the exception that the processor component 350 of the alternate embodiment of FIG. 7 additionally compiles or interprets the application code 110. Therefore, the control routine 340 of the alternate embodiment of the computing device 300 of FIG. 7 may additionally include one or more of the parsing component 142, the resource component 145 and the semaphore component 148. Further, one or more of the parsing component 142, the resource component 145 and the semaphore component 148 may components of a compiler or interpreter 341 of the control routine 340. In embodiments in which the processor component 350 compiles the application code 110, a compiled version of the application code 110 (depicted in dotted lines) may be generated. In embodiments in which the processor component 350 interprets the application code 110, there may also be an intermediate version of the application code 110 generated (again, depicted in dotted lines) as part of the preparation of portions of the application code 110 for execution. As readily recognizable by those skilled in the art, execution of code may entail an address translation process by which at least a subset of instructions may be modified to include addresses indicative of locations within a storage (e.g., the storage 360) at which portions of the code are stored for execution.

Figure 8:
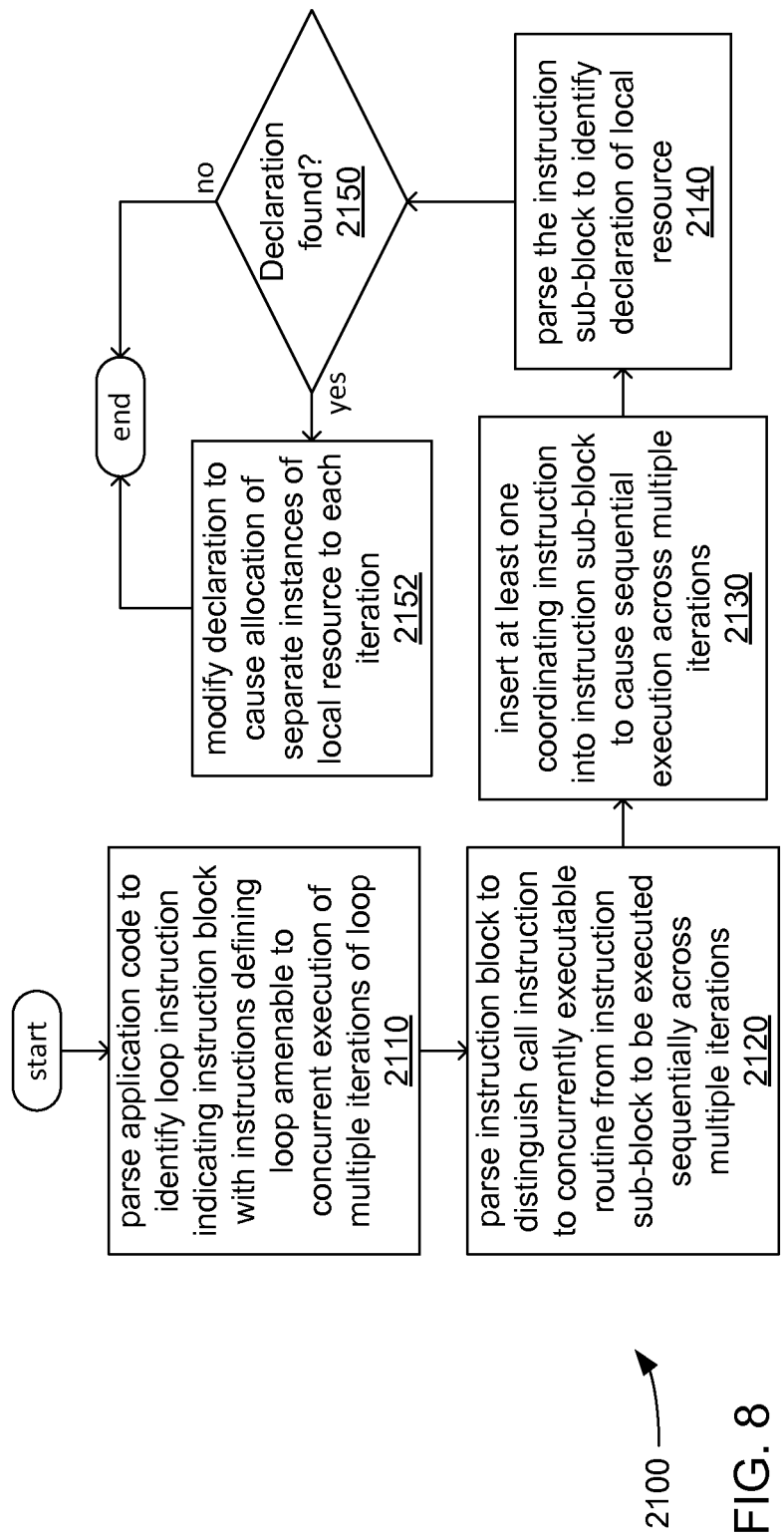
FIG. 8 illustrates an example of an embodiment of a first logic flow.

FIG. 8 illustrates an example of an embodiment of a logic flow 2100. The logic flow 2100 may be representative of some or all of the operations executed by one or more embodiments described herein. More specifically, the logic flow 2100 may illustrate operations performed by the processor component 150 in executing at least the control routine 140, and/or performed by other component(s) of the compiling device 100, in at least compiling the application code 110.

At 2110, a processor component of a compiling device (e.g., the processor component 150 of the compiling device 100) parses application code to identify a loop instruction (e.g., the loop instruction 113 of the application code 110) indicating that an instruction block (e.g., the instruction block 112) is made up of instructions that define a loop that is amenable to concurrent execution. As previously discussed, such concurrent execution entails the concurrent execution of at least a call to a concurrently executable solve routine of a library (e.g., the solve routine 177 of the library code 170) in multiple iterations of the loop defined by the instructions of the instruction block (e.g., the iterations 312x-z). As also previously discussed, the loop instruction that provides such an indication may be an altered version of a loop instruction indicative of sequential execution of iterations of the loop.

At 2120, the instructions of the instruction block are parsed to distinguish a call instruction to call a concurrently executable routine (e.g., the solve routine 177) from at least one instruction sub-block (e.g., one or both of the instruction sub-blocks 114a-b) that are to be executed sequentially across multiple iterations of the loop (e.g., the iterations 312x-z). As previously discussed, it is envisioned that persons writing the application code, including the instructions of such sub-blocks, may be somewhat unfamiliar with aspects of writing code for concurrent execution, and therefore, one or more of the instruction sub-blocks are executed sequentially across multiple iterations of the loop to at least minimize possible execution errors that may otherwise result from attempting to execute those instruction sub-blocks concurrently. At 2130, at least one coordinating instruction is inserted into at least one of the identified instruction sub-blocks to cause sequential execution of that at least one sub-block across the multiple iterations of the loop.

At 2140, the instructions of the instruction sub-block are parsed to identify any declarations of local resources. If such a declaration is found at 2150, then such a declaration may be modified at 2152 to ensure that each iteration of the loop is provided with a separate instance of the local resource associated with that declaration.

Figure 9:
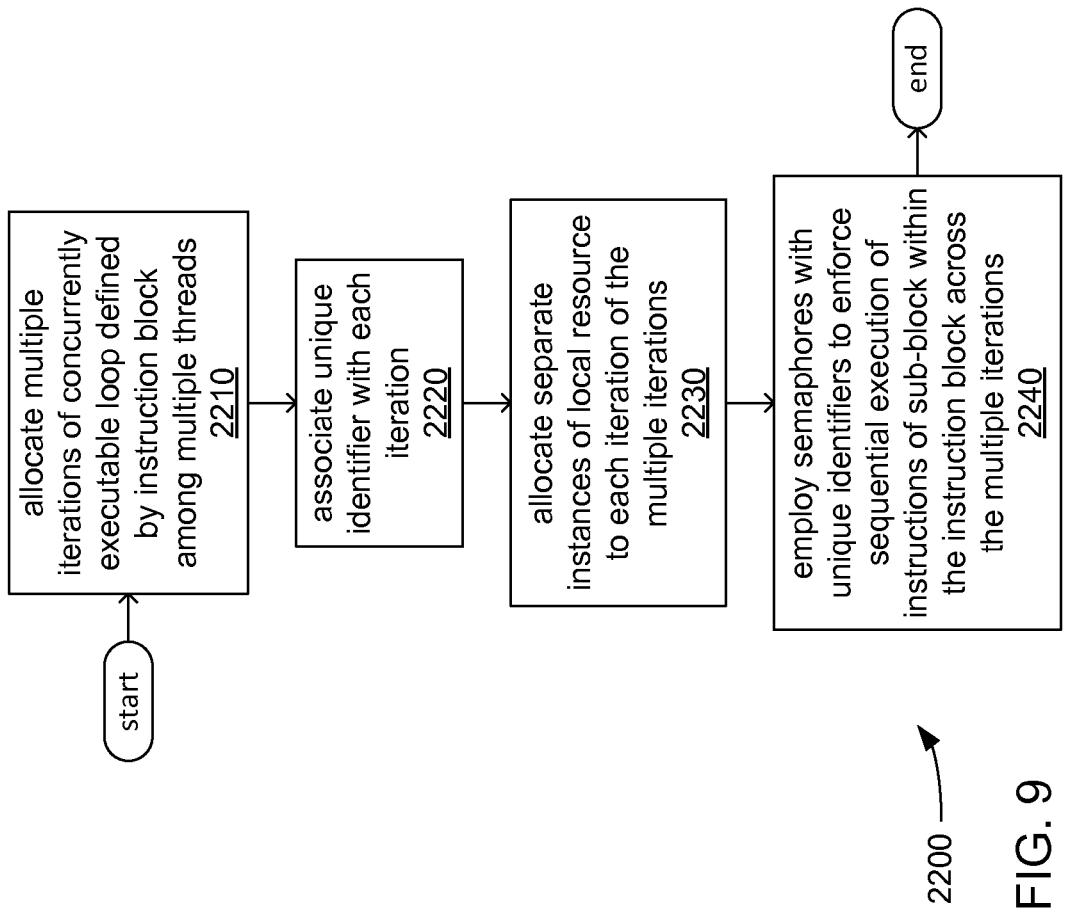
FIG. 9 illustrates an example of an embodiment of a second logic flow.

FIG. 9 illustrates an example of an embodiment of a logic flow 2200. The logic flow 2200 may be representative of some or all of the operations executed by one or more embodiments described herein. More specifically, the logic flow 2200 may illustrate operations performed by the processor component 350 in executing at least the control routine 340, and/or performed by other component(s) of the computing device 300, in at least coordinating execution of multiple iterations of the loop defined by the instruction block 112 of the application code 110.

At 2210, a processor component of a computing device (e.g., the processor component 350 of the computing device 300) allocates multiple iterations of a concurrently executable loop defined by an instruction block of at least a portion of application code (e.g., the instruction block 112 of the application code 110) among multiple threads (e.g., the threads 372r-t). As previously discussed, such threads may be executed by multiple cores of the same processor component of the same computing device as coordinates the execution of the iterations of the loop (e.g., the processor component 350 of the computing device 300). Alternatively, as also previously discussed, such threads may be executed by one or more cores of one or more processor components of one or more other computing devices (e.g., the processor component 550 of the computing devices 500).

At 2220, a unique identifier is associated with each of the iterations of the loop. At 2230, separate instances of a local resource are allocated to each of the iterations. As previously discussed, such allocation of separate instances of a local resource to each iteration ensures that accidental dependencies do not develop between iterations.

At 2240, semaphores making use of the unique identifiers are employed as part of enforcing the sequential execution of instructions of a sub-block of instructions within the instruction block 112 across the multiple iterations such that execution of the instruction sub-block in one iteration is not allowed to begin until execution of the instruction sub-block in another iteration has been completed. As previously discussed at least one coordinating instruction of the instruction sub-block of one of those iterations may specifically identify the other iteration with which execution of the instruction sub-block is coordinated by the unique identifier associated with that other iteration.

Figure 10:
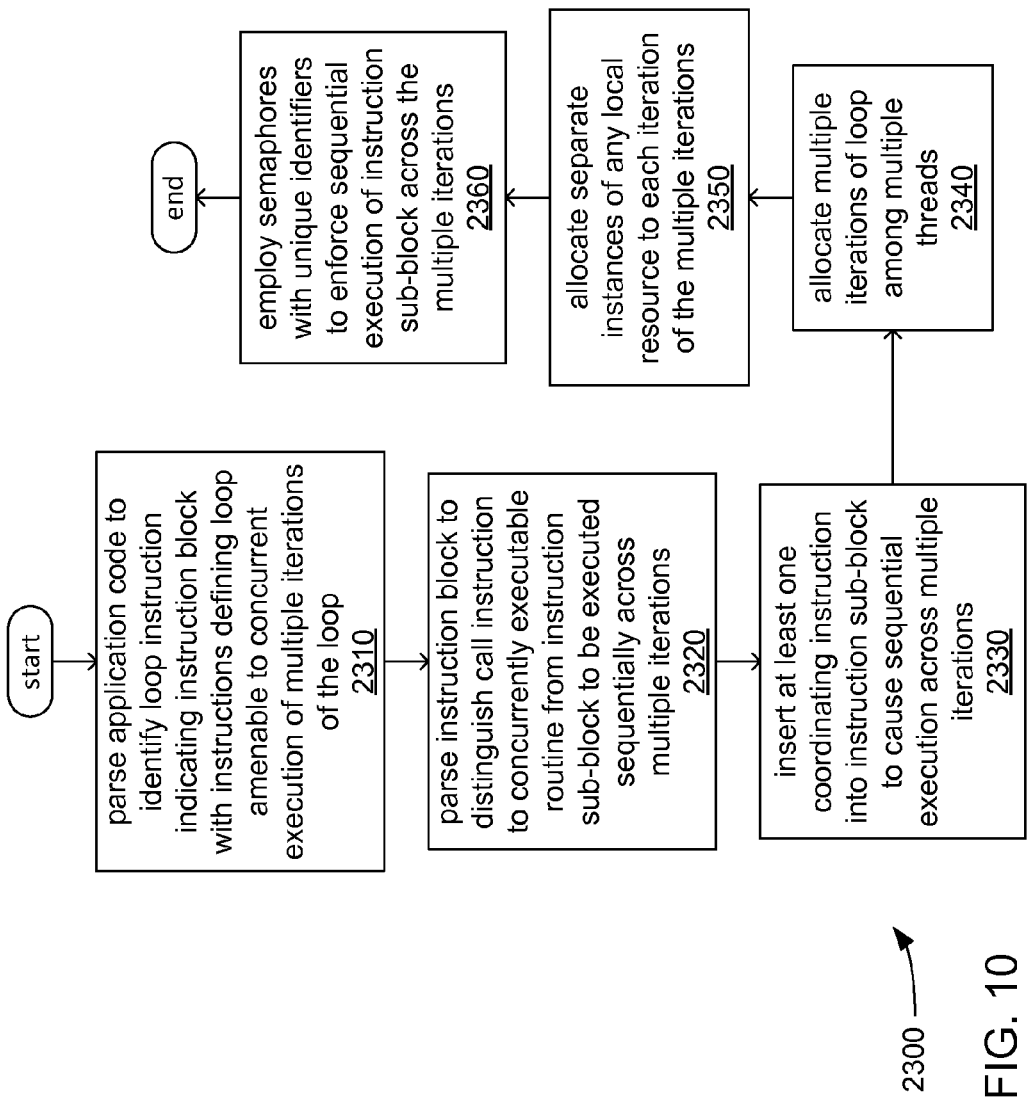
FIG. 10 illustrates an example of an embodiment of a third logic flow.

FIG. 10 illustrates an example of an embodiment of a logic flow 2300. The logic flow 2300 may be representative of some or all of the operations executed by one or more embodiments described herein. More specifically, the logic flow 2300 may illustrate operations performed by the processor component 350 in executing at least the control routine 340, and/or performed by other component(s) of the computing device 300, in compiling or interpreting the application code 110, as well as also coordinating execution of multiple iterations of the loop defined by the instruction block 112 of the application code 110.

At 2310, a processor component of a computing device (e.g., the processor component 350 of the computing device 300) parses application code to identify a loop instruction (e.g., the loop instruction 113 of the application code 110) indicating that an instruction block (e.g., the instruction block 112) is made up of instructions that define a loop that is amenable to concurrent execution. Again, such concurrent execution entails the concurrent execution of at least a call to a concurrently executable solve routine of a library (e.g., the solve routine 177 of the library code 170) in multiple iterations of the loop defined by the instructions of the instruction block (e.g., the iterations 312x-z).

At 2320, the instructions of the instruction block are parsed to distinguish a call instruction to call a concurrently executable routine (e.g., the solve routine 177) from at least one instruction sub-block (e.g., one or both of the instruction sub-blocks 114a-b) that are to be executed sequentially across multiple concurrently executed iterations of the loop (e.g., the iterations 312x-z). At 2330, at least one coordinating instruction is inserted into at least one of the identified instruction sub-blocks to cause sequential execution of that at least one sub-block across the multiple iterations of the loop.

At 2340, multiple iterations of the loop are allocated among multiple threads (e.g., the threads 372r-t). Again, such threads may be executed by multiple cores of the same processor component of the same computing device as coordinates the execution of the iterations of the loop (e.g., the processor component 350 of the computing device 300). Alternatively, such threads may be executed by one or more cores of one or more processor components of one or more other computing devices (e.g., the processor component 550 of the computing devices 500).

At 2350, separate instances of any local resource declared in the instructions of the instruction block are allocated to each of the iterations. At 2360, semaphores making use of unique identifiers associated with each iteration are employed as part of enforcing the sequential execution of instruction sub-block across the multiple iterations such that execution of the instruction sub-block in one iteration is not allowed to begin until execution of the instruction sub-block in another iteration has been completed.

Figure 11:
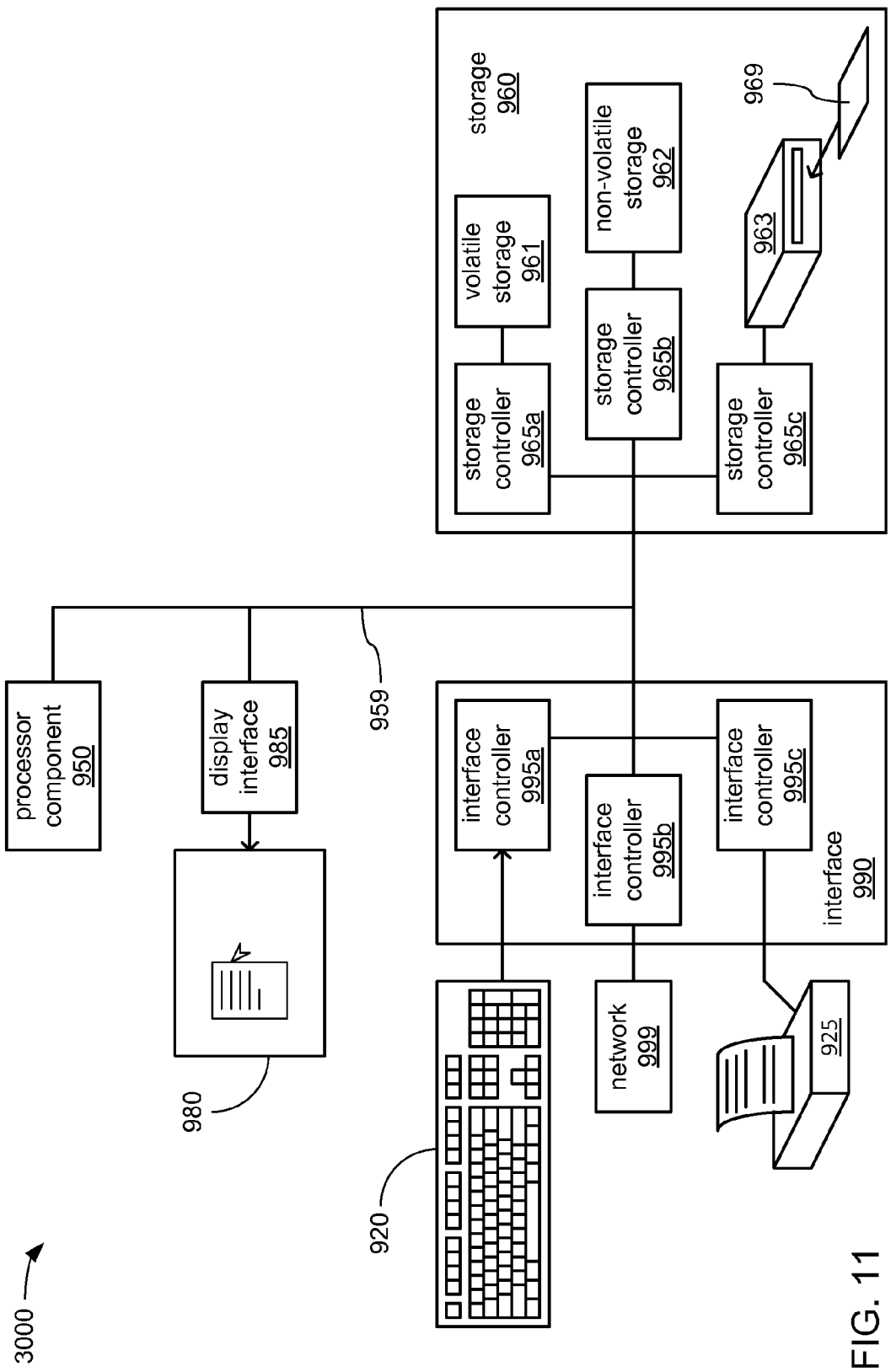
FIG. 11 illustrates an example of an embodiment of a processing architecture.

FIG. 11 illustrates an example of an embodiment of a processing architecture 3000 suitable for implementing various embodiments as previously described. More specifically, the processing architecture 3000 (or variants thereof) may be implemented as part of one or more of the computing devices 100 or 300. It should be noted that components of the processing architecture 3000 are given reference numbers in which the last two digits correspond to the last two digits of reference numbers of at least some of the components earlier depicted and described as part of the computing devices 100 and 300. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the unidirectional or bi-directional exchange of information. For each iteration, the components may exchange such information over the communications media. A message (including a command, status, address or data message) may be among such exchanged information, and may be transmitted either serially or substantially in parallel through any of a variety of connections and/or interfaces.

As depicted, in implementing the processing architecture 3000, a computing device includes at least a processor component 950, a storage 960, an interface 990 to other devices, and a coupling 959. As will be explained, depending on various aspects of a computing device implementing the processing architecture 3000, including its intended use and/or conditions of use, such a computing device may further include additional components, such as without limitation, a display 980 and a display interface 985.

The coupling 959 includes one or more buses, point-to-point interconnects, transceivers, buffers, crosspoint switches, and/or other conductors and/or logic that communicatively couples at least the processor component 950 to the storage 960. Coupling 959 may further couple the processor component 950 to one or more of the interface 990, the audio subsystem 970 and the display interface 985 (depending on which of these and/or other components are also present). With the processor component 950 being so coupled by couplings 959, the processor component 950 is able to perform the various ones of the tasks described at length, above, for whichever one(s) of the aforedescribed computing devices implement the processing architecture 3000. Coupling 959 may be implemented with any of a variety of technologies or combinations of technologies by which commands, addresses and/or data are optically and/or electrically conveyed. Further, at least portions of coupling 959 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to the processor components 150 and 350) may include any of a wide variety of commercially available processors, employing any of a wide variety of technologies and implemented with one or more cores physically combined in any of a number of ways.

As previously discussed, the storage 960 (corresponding to the storages 160 and 360) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as including multiple distinct types of storage is in recognition of the commonplace use of more than one type of storage device in computing devices in which one type provides relatively rapid reading and writing capabilities enabling more rapid manipulation of data by the processor component 950 (but in which a "volatile" technology may be used constantly requiring electric power) while another type provides relatively high density of non-volatile storage (but likely provides relatively slow reading and writing capabilities).

Given the often different characteristics of different storage devices employing different technologies, different storage devices may be coupled to other portions of a computing device through different storage controllers coupled to their differing storage devices through different interfaces. By way of example, where the volatile storage 961 is present and is based on RAM technology, the volatile storage 961 may be communicatively coupled to coupling 959 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (which may correspond to the interfaces 190 or 390) may employ any of a variety of communications technologies corresponding to any of a variety of communications technologies that may be employed to communicatively couple a computing device to one or more other devices. Again, one or both of various forms of wired or wireless communications may be employed to enable the processor component 950 to interact with input/output devices (e.g., the depicted example keyboard 920 or printer 925) and/or other computing devices, where such interaction may be through a network (e.g., the network 999) or an interconnected set of networks. In recognition of the often greatly different character of multiple types of timings and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data from those persons via gestures and/or facial expressions, laser printers, inkjet printers, mechanical robots, milling machines, etc.

Where a computing device is communicatively coupled to (or perhaps, actually incorporates) a touch screen (e.g., the depicted example display 980, corresponding to the touch screen 580), such a computing device implementing the processing architecture 3000 may also include the display interface 985. Although more generalized types of interface may be employed in communicatively coupling to a display (whether of the touch screen variety, or not), the somewhat specialized additional processing often required in visually displaying various forms of content on a display, as well as the somewhat specialized nature of the cabling-based interfaces used, often makes the provision of a distinct display interface desirable. Wired and/or wireless communications technologies that may be employed by the display interface 985 in a communicative coupling of the display 980 may make use of timing and/or protocols that conform to any of a variety of industry standards, including without limitation, any of a variety of analog video interfaces, Digital Video Interface (DVI), DisplayPort, etc.

What has been described above includes examples of the disclosed architecture. It is, of course, not possible to describe every conceivable combination of components and/or methodologies, but one of ordinary skill in the art may recognize that many further combinations and permutations are possible. Accordingly, the system architecture is intended to embrace all such alterations, modifications and variations that fall within the spirit and scope of the appended claims.

The invention claimed is:

1. At least one non-transitory machine-readable storage medium comprising instructions that when executed by a computing device, cause the computing device to:
   parse an application code to identify a loop instruction indicative of an instruction block comprising instructions that define a loop of which multiple iterations are capable of concurrent execution, the instructions comprising at least one call instruction to an executable routine capable of concurrent execution;
   insert at least one coordinating instruction into an instruction sub-block of the instruction, block to cause sequential execution of instructions of the instruction sub-block across the multiple iterations based on identification of the loop instruction, the instruction sub-block preceding the call instruction within the instruction block and comprising an access instruction to retrieve data from an input resource, the computing device caused to enforce sequential execution of the instruction sub-block to cause data of the input resource to be retrieved by the access instruction in a predetermined order of the sequential execution of the instruction sub-block across the multiple iterations;
   allocate execution of each iteration of the multiple iterations to a thread of multiple threads;
   associate a unique identifier with each iteration of the multiple iterations; and
   employ the unique identifier of one iteration of the multiple iterations in the at least one coordinating instruction in another iteration of the multiple iterations to enforce sequential execution of the instruction sub-block across the one and the other of the iterations.

2. At least one non-transitory machine-readable storage medium comprising instructions that when executed by a computing device, cause the computing device to:
   parse an application code to identify a loop instruction indicative of an instruction block comprising instructions that define a loop of which multiple iterations are capable of concurrent execution, the instructions comprising at least one call instruction to an executable routine capable of concurrent execution;
   insert at least one coordinating instruction into an instruction sub-block of the instruction block to cause sequential execution of instructions of the instruction sub-block across the multiple iterations based on identification of the loop instruction, the instruction sub-block following the call instruction within the instruction block and comprising an access instruction to write data to an output resource, the computing device caused to enforce sequential execution of the instruction sub-block to cause data to be written to the output resource by the access instruction in a predetermined order of the sequential execution of the instruction sub-block across the multiple iterations;
   allocate execution of each iteration of the multiple iterations to a thread of multiple threads;
   associate a unique identifier with each iteration of the multiple iterations; and
   employ the unique identifier of one iteration of the multiple iterations in the at least one coordinating instruction in another iteration of the multiple iterations to enforce sequential execution of the instruction sub-block across the one and the other of the iterations.

3. The machine-readable storage medium of claim 1 or 2, the computing device caused to:
   parse the instruction block to distinguish the instruction sub-block from the call instruction;
   insert a first coordinating instruction at a beginning of the instruction sub-block; and
   insert a second coordinating instruction at an end of the instruction sub-block.

4. The machine-readable storage medium of claim 3, the computing device caused to:
   allocate execution of one iteration of the multiple iterations on one thread of multiple threads;
   allocate execution of another iteration of the multiple iterations on another thread of the multiple threads; and
   implement a semaphore based on the first and second coordinating instructions to forestall execution of the instruction sub-block in the one iteration until execution of the instruction sub-block in the other iteration is completed.

5. The machine-readable storage medium of claim 1 or 2, the computing device caused to allocate multiple threads among multiple cores of a processor component of the computing device or among multiple processor components of multiple other computing devices.

6. A computer-implemented method comprising:
   parsing, with a processor component, an application code to identify a loop instruction indicative of an instruction block comprising instructions that define a loop of which multiple iterations are capable of concurrent execution, the instructions comprising at least one call instruction to an executable routine capable of concurrent execution;
   inserting at least one coordinating instruction into an instruction sub-block of the instruction block to cause sequential execution of instructions of the instruction sub-block across the multiple iterations based on identification of the loop instruction, the instruction sub-block preceding the call instruction within the instruction block and comprising an access instruction to retrieve data from an input resource, the method comprising enforcing sequential execution of the instruction sub-block to cause data of the input resource to be retrieved by the access instruction in a predetermined order of the sequential execution of the instruction sub-block across the multiple iterations;
   allocating execution of each iteration of the multiple iterations to a thread of multiple threads;
   associating a unique identifier with each iteration of the multiple iterations; and
   employing the unique identifier of one iteration of the multiple iterations in the at least one coordinating instruction in another iteration of the multiple iterations to enforce sequential execution of the instruction sub-block across the one and the other of the iterations.

7. A computer-implemented method comprising:
   parsing, with a processor component, an application code to identify a loop instruction indicative of an instruction block comprising instructions that define a loop of which multiple iterations are capable of concurrent execution, the instructions comprising at least one call instruction to an executable routine capable of concurrent execution; and
   inserting at least one coordinating instruction into an instruction sub-block of the instruction block to cause sequential execution of instructions of the instruction sub-block across the multiple iterations based on identification of the loop instruction, the instruction sub-block following the call instruction within the instruction block and comprising an access instruction to write data to an output resource, the method comprising enforcing sequential execution of the instruction sub-block to cause data to be written to the output resource by the access instruction in a predetermined order of the sequential execution of the instruction sub-block across the multiple iterations allocating execution of each iteration of the multiple iterations to a thread of multiple threads;

associating a unique identifier with each iteration of the multiple iterations; and employing the unique identifier of one iteration of the multiple iterations in the at least one coordinating instruction in another iteration of the multiple iterations to enforce sequential execution of the instruction sub-block across the one and the other of the iterations.

8. A computer-implemented method comprising:

parsing, with a processor component, an application code to identify a loop instruction indicative of an instruction block comprising instructions that define a loop of which multiple iterations are capable of concurrent execution, the instructions comprising at least one call instruction to an executable routine capable of concurrent execution; and inserting at least one coordinating instruction into an instruction sub-block of the instruction block to cause sequential execution of instructions of the instruction sub-block across the multiple iterations based on identification of the loop instruction, the instruction sub-block preceding the call instruction within the instruction block and another instruction sub-block following the call instruction within the instruction block, the method comprising enforcing an order of execution that results in execution of the instruction sub-block to be completed across all iterations of the multiple iterations before execution of the other instruction sub-block occurs in any iteration of the multiple iterations allocating execution of each iteration of the multiple iterations to a thread of multiple threads;

associating a unique identifier with each iteration of the multiple iterations; and employing the unique identifier of one iteration of the multiple iterations in the at least one coordinating instruction in another iteration of the multiple iterations to enforce sequential execution of the instruction sub-block across the one and the other of the iterations.

9. The computer-implemented method of claim 6 or 7 or 8, comprising distinguishing the loop instruction from a sequential loop instruction not indicative of an instruction block comprising instructions that define a loop of which multiple iterations are capable of concurrent execution.

10. The computer-implemented method of claim 9, the sequential loop instruction comprising a loop instruction of a programming language indicative of only sequential execution of multiple iterations, and the loop instruction comprising an altered version of the sequential loop instruction.

11. The computer-implemented method of claim 6 or 7 or 8, comprising:

parsing, with the processor component, the instruction block to distinguish the instruction sub-block from the call instruction;

inserting a first coordinating instruction at a beginning of the instruction sub-block; and inserting a second coordinating instruction at an end of the instruction sub-block.

12. The computer-implemented method of claim 11, comprising:

allocating execution of one iteration of the multiple iterations on one thread of multiple threads;

allocating execution of another iteration of the multiple iterations on another thread of the multiple threads; and implementing a semaphore based on the first and second coordinating instructions to forestall execution of the instruction sub-block in the one iteration until execution of the instruction sub-block in the other iteration is completed.

13. The computer-implemented method of claim 6 or 7 or 8, the executable routine comprising instructions to perform computations concurrently or instructions to perform search operations concurrently.

14. The computer-implemented method of claim 13, wherein the executable routine is capable of concurrent execution across the multiple iterations.

15. An apparatus comprising:

a processor component at least partially implemented in hardware;

logic, at least partially implemented by the processor component, the logic to:

parse an application code to identify a loop instruction indicative of an instruction block comprising instructions that define a loop of which multiple iterations are capable of concurrent execution, the instructions comprising at least one call instruction to a executable routine capable of concurrent execution;

insert at least one coordinating instruction into an instruction sub-block of the instruction block to cause sequential execution of instructions of the instruction sub-block across the multiple iterations based on identification of the loop instruction, the instruction sub-block preceding the call instruction within the instruction block and comprising an access instruction to retrieve data from an input resources;

enforce sequential execution of the instruction sub-block to cause data of the input resource to be retrieved by the access instruction in a predetermined order of the sequential execution of the instruction sub-block across the multiple iterations;

allocate execution of each iteration of the multiple iterations to a thread of multiple threads and associate a unique identifier with each iteration of the multiple iterations; and employ the unique identifier of one iteration of the multiple iterations in the at least one coordinating instruction in another iteration of the multiple iterations to enforce sequential execution of the instruction sub-block across the one and the other of the iterations.

16. An apparatus comprising:

a processor component at least partially implemented in hardware;

logic, at least partially implemented by the processor component, the logic to:

parse an application code to identify a loop instruction indicative of an instruction block comprising instructions that define a loop of which multiple iterations are capable of concurrent execution, the instructions comprising at least one call instruction to a executable routine capable of concurrent execution;

insert at least one coordinating instruction into an instruction sub-block of the instruction block to cause sequential execution of instructions of the instruction sub-block across the multiple iterations based on identification of the loop instruction, the instruction sub-block following the call instruction within the instruction block and comprising an access instruction to write data to an output resources;

enforce sequential execution of the instruction sub-block to cause data to be written to the output resource by the access instruction in a predetermined order of the sequential execution of the instruction sub-block across the multiple iterations;

allocate execution of each iteration of the multiple iterations to a thread of multiple threads and associate a unique identifier with each iteration of the multiple iterations; and employ the unique identifier of one iteration of the multiple iterations in the at least one coordinating instruction in another iteration of the multiple iterations to enforce sequential execution of the instruction sub-block across the one and the other of the iterations.

17. An apparatus comprising:

a processor component at least partially implemented in hardware;

logic, at least partially implemented by the processor component, the logic to:

parse an application code to identify a loop instruction indicative of an instruction block comprising instructions that define a loop of which multiple iterations are capable of concurrent execution, the instructions comprising at least one call instruction to an executable routine capable of concurrent execution;

insert at least one coordinating instruction into an instruction sub-block of the instruction block to cause sequential execution of instructions of the instruction sub-block across the multiple iterations based on identification of the loop instruction, the instruction sub-block preceding the call instruction within the instruction block and another instruction sub-block following the call instruction within the instruction block;

enforce an order of execution that results in execution of the instruction sub-block to be completed across all iterations of the multiple iterations before execution of the other instruction sub-block occurs in any iteration of the multiple iterations;

allocate execution of each iteration of the multiple iterations to a thread of multiple threads and associate a unique identifier with each iteration of the multiple iterations; and employ the unique identifier of one iteration of the multiple iterations in the at least one coordinating instruction in another iteration of the multiple iterations to enforce sequential execution of the instruction sub-block across the one and the other of the iterations.

18. The apparatus of claim 15 or 16 or 17, the logic to distinguish the loop instruction from a sequential loop instruction not indicative of an instruction block comprising instructions that define a loop of which multiple iterations are capable of concurrent execution.

19. The apparatus of claim 15 or 16 or 17, the logic to distinguish the instruction sub-block from the call instruction, and to insert a first coordinating instruction at a beginning of the instruction sub-block and insert a second coordinating instruction at an end of the instruction sub-block.

20. The apparatus of claim 19, the logic to:

allocate execution of one iteration of the multiple iterations on one thread of multiple threads and allocate execution of another iteration of the multiple iterations on another thread of the multiple threads; and implement a semaphore based on the first and second coordinating instructions to forestall execution of the instruction sub-block in the one iteration until execution of the instruction sub-block in the other iteration is completed.

21. The apparatus of claim 15 or 16 or 17, the concurrently executable routine comprising instructions to perform computations concurrently or instructions to perform search operations concurrently.

22. The apparatus of claim 15 or 16 or 17, the processor component comprising multiple cores, and the logic to allocate multiple threads among the multiple cores and to allocate the multiple iterations among the multiple threads.

23. The apparatus of claim 15 or 16 or 17, comprising:

an interface to couple the processor component to multiple computing devices through a network; and the logic to allocate multiple threads among the multiple computing devices and to allocate the multiple iterations among the multiple threads.

24. The apparatus of claim 23, comprising the network and the multiple computing devices.

25. A computer-implemented method comprising:

distinguishing a loop instruction indicative of instructions that define a loop of which multiple iterations are capable of concurrent execution from a sequential loop instruction indicative of other instructions that define another loop of which multiple iterations are required to be executed sequentially;

generating an instruction block comprising instructions that when executed cause a processor component to execute the multiple iterations concurrently based on the loop instruction;

inserting at least one coordinating instruction into an instruction sub-block of the instruction block to cause sequential execution of instructions of the instruction sub-block across the multiple iterations based on the loop instruction, the instruction sub-block following a call instruction of the instructions within the instruction block and comprising an access instruction to write data to an output resource;

enforcing sequential execution of the instruction sub-block to cause data to be written to the output resource by the access instruction in a predetermined order of the sequential execution of the instruction sub-block across the multiple iterations allocating execution of each iteration of the multiple iterations to a thread of multiple threads;

associating a unique identifier with each iteration of the multiple iterations; and employing the unique identifier of one iteration of the multiple iterations in the at least one coordinating instruction in another iteration of the multiple iterations to enforce sequential execution of the instruction sub-block across the one and the other of the iterations.

26. The computer-implemented method of claim 25, the sequential loop instruction comprising a loop instruction of a programming language indicative of only sequential execution of multiple iterations, and the loop instruction comprising an altered version of the sequential loop instruction.

27. The computer-implemented method of claim 26, the loop instruction comprising a "COFOR" instruction and the sequential loop instruction comprising a "FOR" instruction.

28. The computer-implemented method of claim 25, the processor component comprising multiple cores, and the method comprising:
allocating multiple threads among the multiple cores; and
allocating the multiple iterations among the multiple threads.

29. The computer-implemented method of claim 25, comprising:
allocating multiple threads among multiple computing devices; and
allocating the multiple iterations among the multiple threads.

30. A computer-implemented method comprising:
distinguishing a loop instruction indicative of instructions that define a loop of which multiple iterations are capable of concurrent execution from a sequential loop instruction indicative of other instructions that define another loop of which multiple iterations are required to be executed sequentially;
generating an instruction block comprising instructions that when executed cause a processor component to execute the multiple iterations concurrently based on the loop instruction;
inserting at least one coordinating instruction into an instruction sub-block of the instruction block to cause sequential execution of instructions of the instruction sub-block across the multiple iterations based on the loop instruction, the instruction sub-block preceding a call instruction of the instructions within the instruction block and comprising an access instruction to retrieve data from an input resource;
enforcing sequential execution of the instruction sub-block to cause data of the input resource to be retrieved by the access instruction in a predetermined order of the sequential execution of the instruction sub-block across the multiple iterations allocating execution of each iteration of the multiple iterations to a thread of multiple threads;
associating a unique identifier with each iteration of the multiple iterations; and
employing the unique identifier of one iteration of the multiple iterations in the at least one coordinating instruction in another iteration of the multiple iterations to enforce sequential execution of the instruction sub-block across the one and the other of the iterations.

31. The computer-implemented method of claim 30, the sequential loop instruction comprising a loop instruction of a programming language indicative of only sequential execution of multiple iterations, and the loop instruction comprising an altered version of the sequential loop instruction.

32. The computer-implemented method of claim 31, the loop instruction comprising a "COFOR" instruction and the sequential loop instruction comprising a "FOR" instruction.

33. The computer-implemented method of claim 30, the processor component comprising multiple cores, and the method comprising:
allocating multiple threads among the multiple cores; and
allocating the multiple iterations among the multiple threads.

34. The computer-implemented method of claim 30, comprising:
allocating multiple threads among multiple computing devices; and
allocating the multiple iterations among the multiple threads.

* * * * *

UNITED STATES PATENT AND TRADEMARK OFFICE
CERTIFICATE OF CORRECTION

PATENT NO. : 9,582,256 B2
APPLICATION NO. : 14/143273
DATED : February 28, 2017
INVENTOR(S) : Jack Joseph Rouse, Leonardo Bezerra Lopes and Robert William Pratt Page 1 of 1

It is certified that error appears in the above-identified patent and that said Letters Patent is hereby corrected as shown below:

In the Claims

Column 21, Line 16, Claim 1 delete "," after instruction

Signed and Sealed this
Seventh Day of November, 2017

Joseph Matal
*Performing the Functions and Duties of the*
*Under Secretary of Commerce for Intellectual Property and*
*Director of the United States Patent and Trademark Office*